United States Patent [19]

Ganz

[11] E Re. 28,535

[45] Reissued Sept. 2, 1975

[54] PACKAGING MACHINE AND METHOD

[76] Inventor: Robert H. Ganz, 8 Ridgecrest Rd., Saddle River, N.J. 07458

[22] Filed: Aug. 22, 1974

[21] Appl. No.: 499,640

Related U.S. Patent Documents

Reissue of:

[64] Patent No.: 3,660,961
Issued: May 9, 1972
Appl. No.: 47,996
Filed: June 22, 1970

[52] U.S. Cl. ..... 53/26; 53/30; 53/32; 53/48; 53/159; 53/210

[51] Int. Cl.².....B65B 11/10; B65B 35/44; B65B 49/10

[58] Field of Search..... 53/26, 30, 32, 48, 3, 148, 53/159, 203, 209, 210

[56] References Cited

UNITED STATES PATENTS

| | | | |
|---|---|---|---|
| 2,356,644 | 8/1944 | Arelt | 53/210 |
| 3,417,540 | 12/1968 | Copping et al. | 53/30 X |
| 3,504,476 | 4/1970 | Ehrenfried et al. | 53/210 X |
| 3,513,620 | 5/1970 | Billingsley et al. | 53/48 X |
| 3,545,165 | 12/1970 | Greenwell | 53/48 X |

*Primary Examiner*—Robert L. Spruill
*Attorney, Agent, or Firm*—Diller, Brown, Ramik & Wight

[57] ABSTRACT

The invention contemplates method and apparatus for the rapid and efficient packaging of clusters of articles, such as beverage containers, with a wrapping such as shrinkable plastic film or sheet. The containers are received at one end of a production line in random succession, are converted into groups or clusters appropriate for packaging, with the maximum dimension of the cluster transverse to the direction of conveyor movement. The clusters are then, in the course of their continuous movement along the conveyor, enveloped with sheet material which is paid out in the longitudinal direction of conveyor movement. In final passage of the conveyor through an oven, the sheet material is adhered to bind the envelopment and is shrunk into tensed limited conformance with the cluster profile.

40 Claims, 21 Drawing Figures

10 Sheets-Sheet 1

PACKAGING MACHINE AND METHOD

Matter enclosed in heavy brackets [ ] appears in the original patent but forms no part of this reissue specification; matter printed in italics indicates the additions made by reissue.

---

This invention relates to automatic packaging and in particular to a machine and method for continuously packaging successive articles or clusters of articles with flexible sheet material as they progress along a conveyor stream.

In the use of heat-shrinkage plastic sheet material to package articles or clusters of articles various machines and techniques have been proposed. These include use of cut-off lengths of the sheet material in tubular form and the use of sheet material in strip form. The tubular material presents an insertion problem and does not lend itself to high-speed, continuously flowing article movement along the conveyor system. The prior techniques of sheet-material use have involved plural sheets for each wrapping, and/or sheeting introduced orthogonally to the direction of conveyor transport. One of the most common cluster configurations for which such wrapping is needed is the familiar "2×3" six pack as used for the marketing of cylindrical cans or for other containers having cylindrical bodies, and the groupings or clustering of containers for such packaging has presented further difficulties.

It is, accordingly, an object of the invention to provide an improved machine and method to avoid or substantially reduce the number of significance of the noted past difficulties.

Another object is to provide a machine and method meeting the above object with inherent, substantially enhanced production-rate capability, as compared to known machines and methods.

A further object is to provide a machine and method meeting the above objects without impairing the smooth continuous flow of closely spaced articles or clusters of articles, from the beginning to the completion of packaging.

A specific object is to provide an automatic continuously flowing article-grouping mechanism, delivering articles aligned in single or double groups of three, for group packaging, as in "1×3" three-packs or "2×3" six-packs, said alignments being transverse to the path of continuous flow.

Another specific object is to provide packaging mechanism using continuously supplied flexible sheet material which is fed to the wrapping location in the direction of movement of container clusters to be wrapped.

A further specific object is to provide shrinkable-plastic wrapping mechanism meeting the above objects.

A general object is to meet the above objects with smoothly continuously running mechanism which involves a minimum of different operations on the work (container clusters), which involves minimum change in motion of the work in the course of production-line movement, and which achieves a superior packaged product at reduced cost.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

Figure 7:
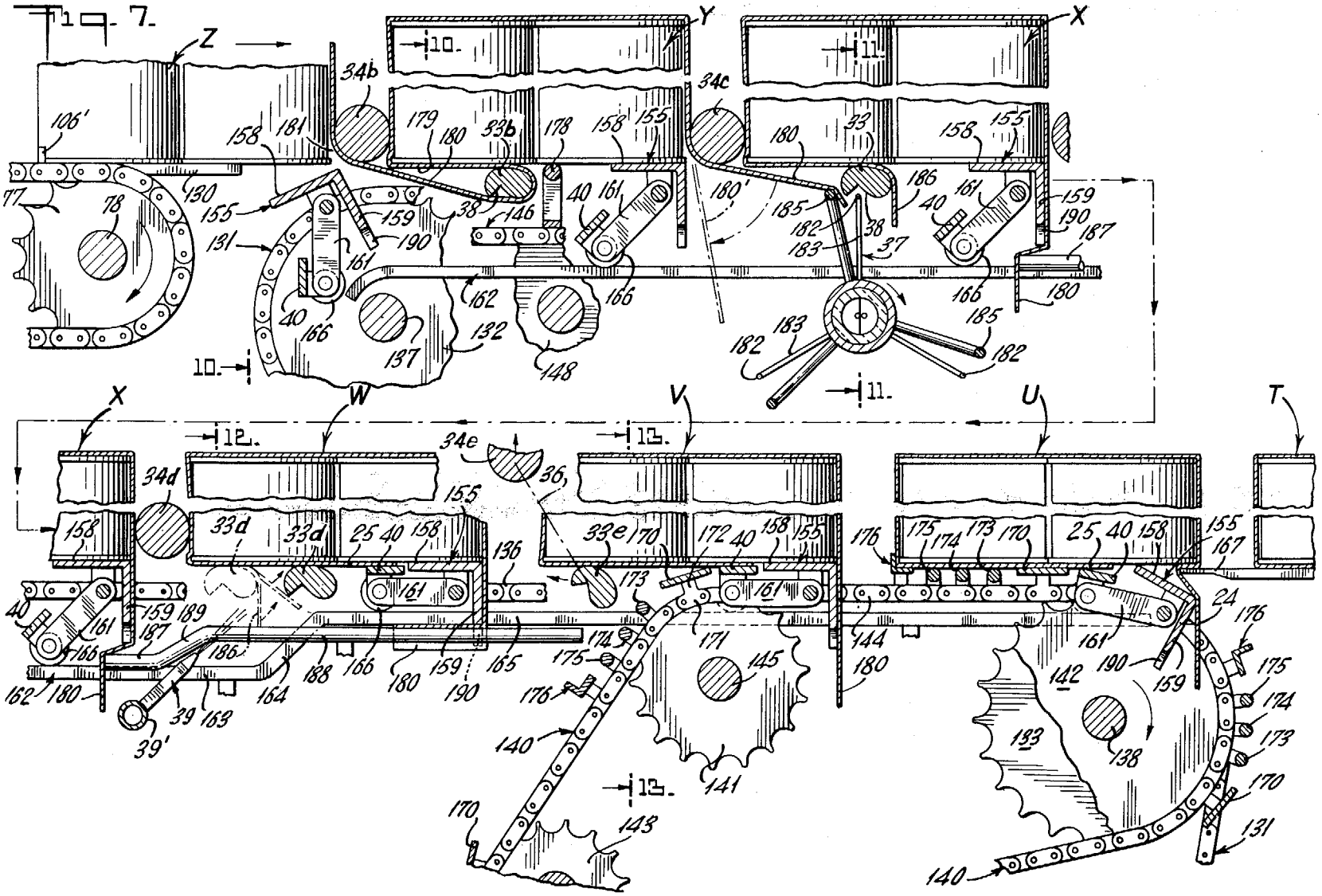
FIG. 7 is an enlarged view similar to FIG. 6, partly broken-away, to show further detail.
Figure 10:
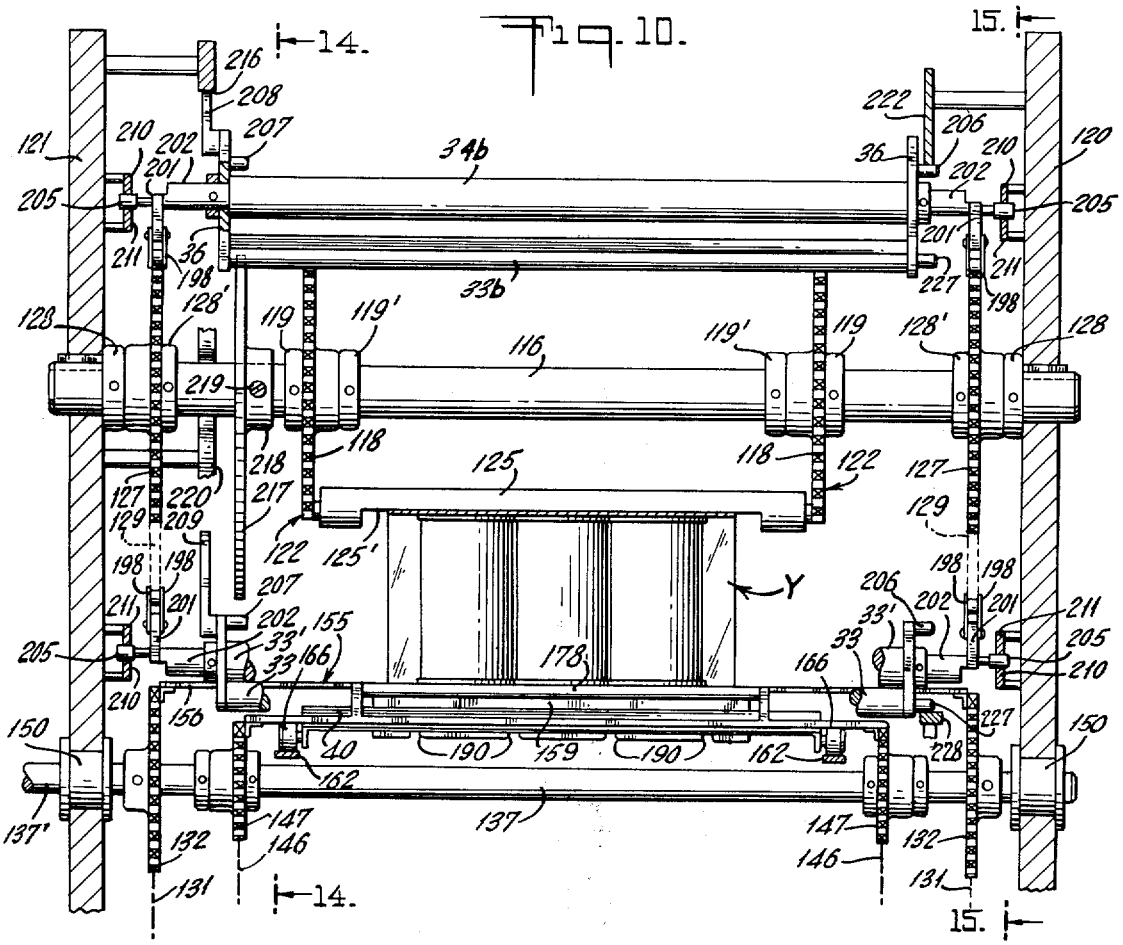
Figure 14:
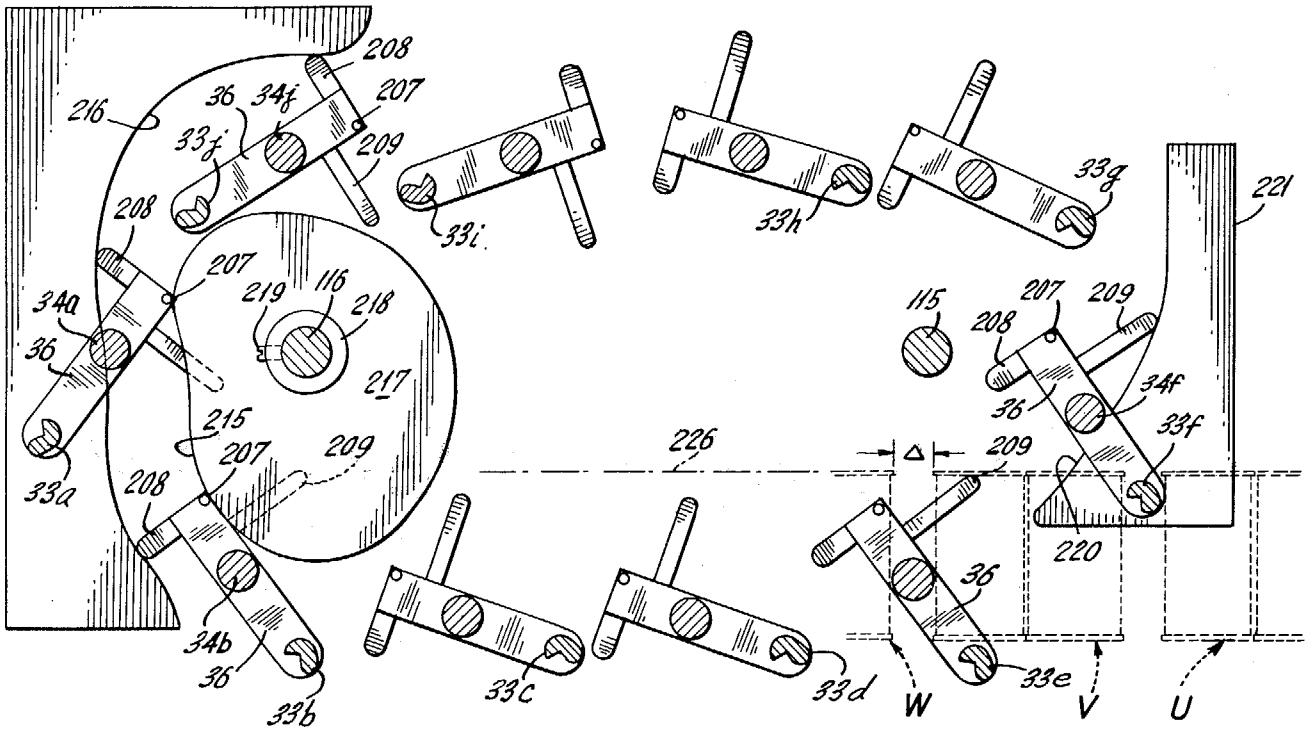
Figures 15, 16:
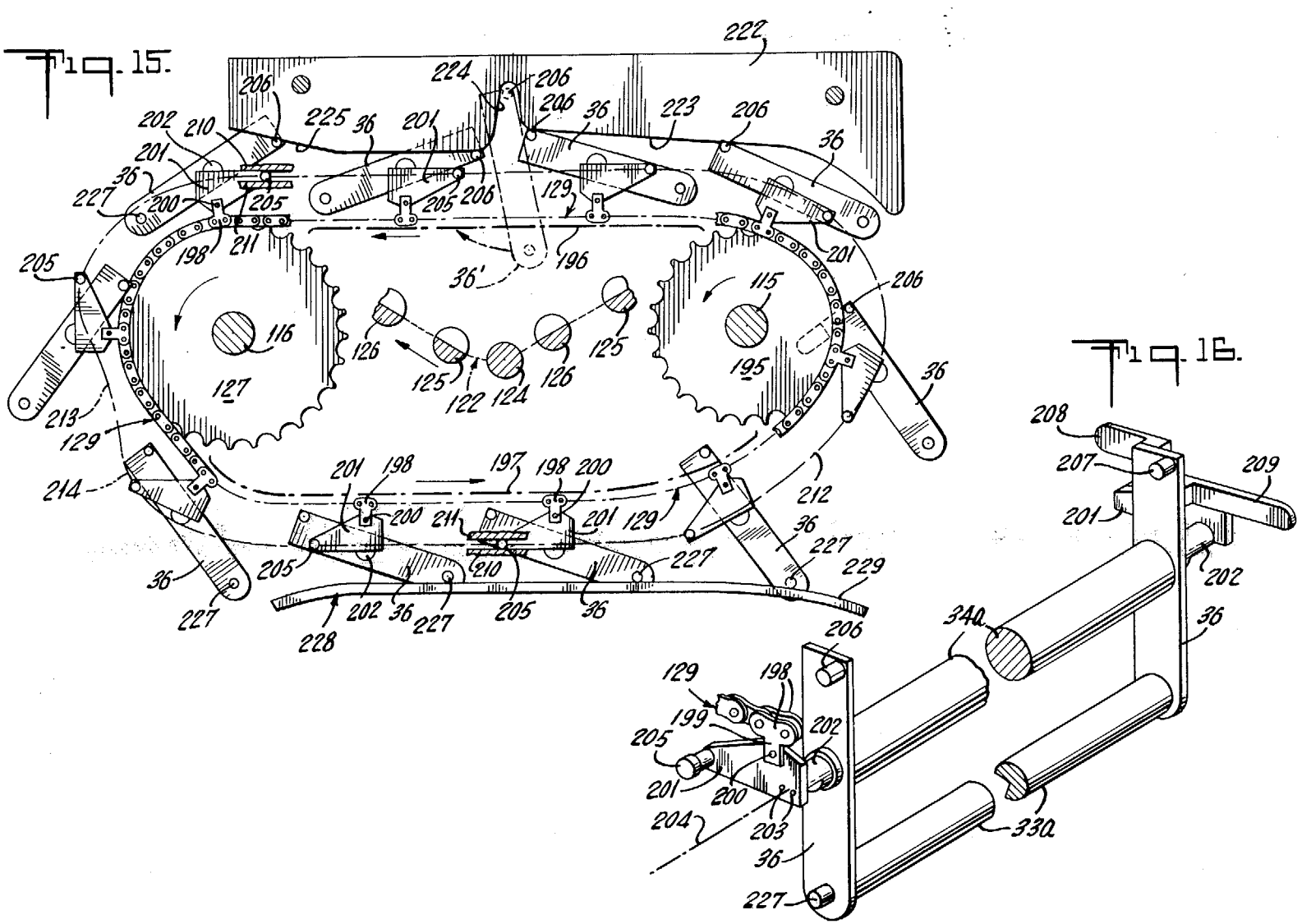
Figures 17, 18, 19:
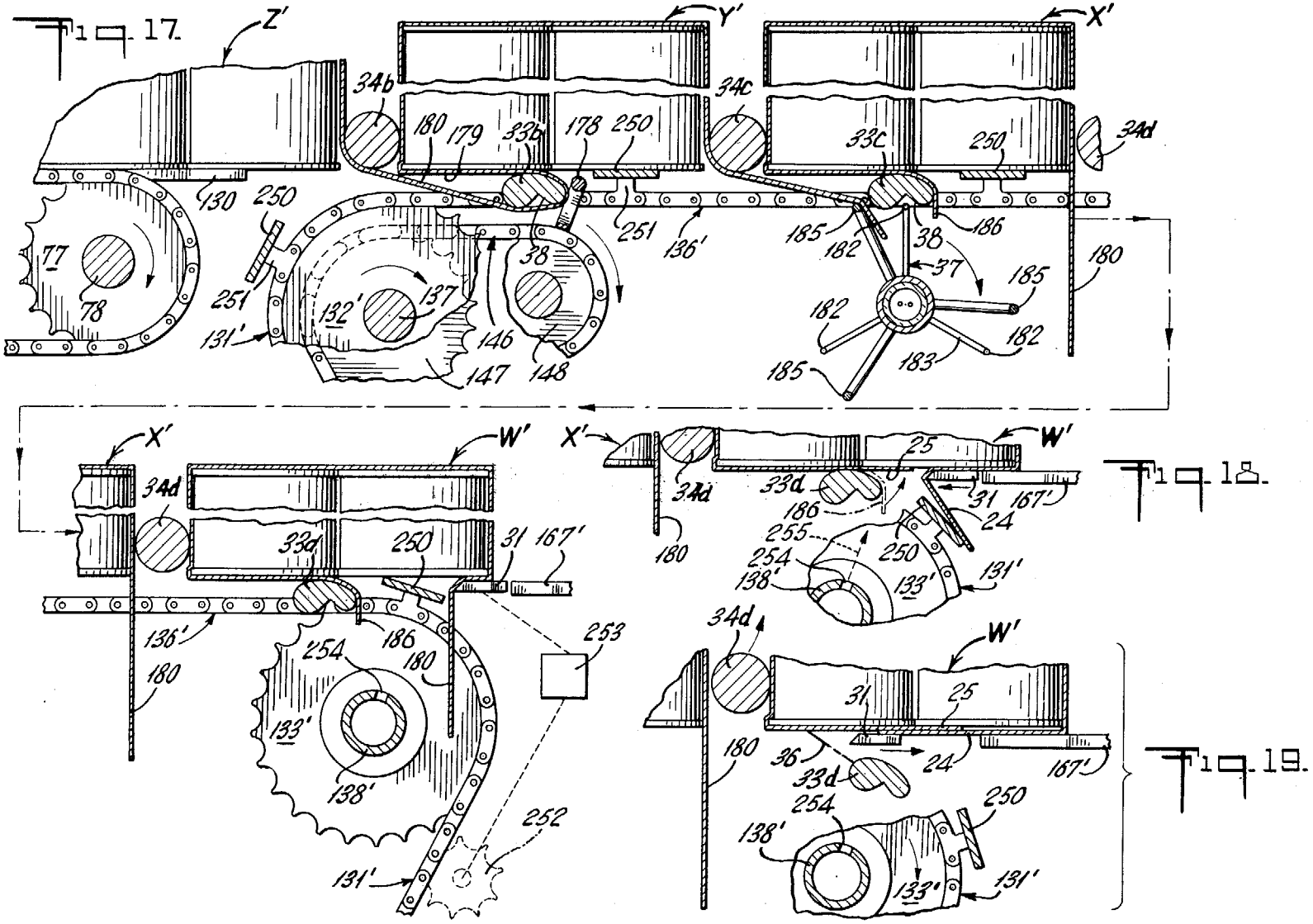

FIGS. 10, 11, 12 and 13 are vertical sectional views taken on the alignments 10—10, 11—11, 12—12, and 13—13, respectively, of FIG. 7;

FIGS. 14 and 15 are simplified vertical sectional views taken on the alignments 14—14 and 15—15, respectively, of FIG. 10;

FIG. 16 is an enlarged fragmentary perspective view of sheet-feeding elements which appear in lesser detail in FIGS. 1, 6, 6A, 7, 10, 14 and 15;

FIG. 17 is a view similar to FIG. 7 to illustrate a modification; and

FIGS. 18 and 19 are fragmentary diagrams as in FIG. 17, to show parts relationships at succeeding instants of time.

Briefly stated, the invention contemplates method and apparatus for the rapid and efficient packaging of clusters of articles, such as beverage containers, with a wrapping such as shrinkable plastic film or sheet. The containers are received at one end of a production line in random succession, are converted into groups or clusters appropriate for packaging, with the maximum dimension of the cluster transverse to the direction of conveyor movement. The clusters are then, in the course of their continuous movement along the conveyor, enveloped with sheet material which is paid out in the longitudinal direction of conveyor movement. In final passage of the conveyor through an oven, the sheet material is adhered to bind the envelopment and is shrunk into tensed limited conformance with the cluster profile.

The invention is disclosed in the context of producing shrink-packing of so-called "2×3" six-packs, wherein six like cylindrical containers or cans are arrayed as two adjacent rows of three, the three being abreast, i.e., aligned side-by-side, transverse to the direction of conveyor movement. Novel methods and means are provided to achieve such groups or clusters, apart from the novel methods and means of wrapping. These portions of the invention will therefore be discussed under separate heads, following a brief introductory description of the overall packaging process.

THE PACKAGING PROCESS, GENERALLY

Figures 1, 3A:
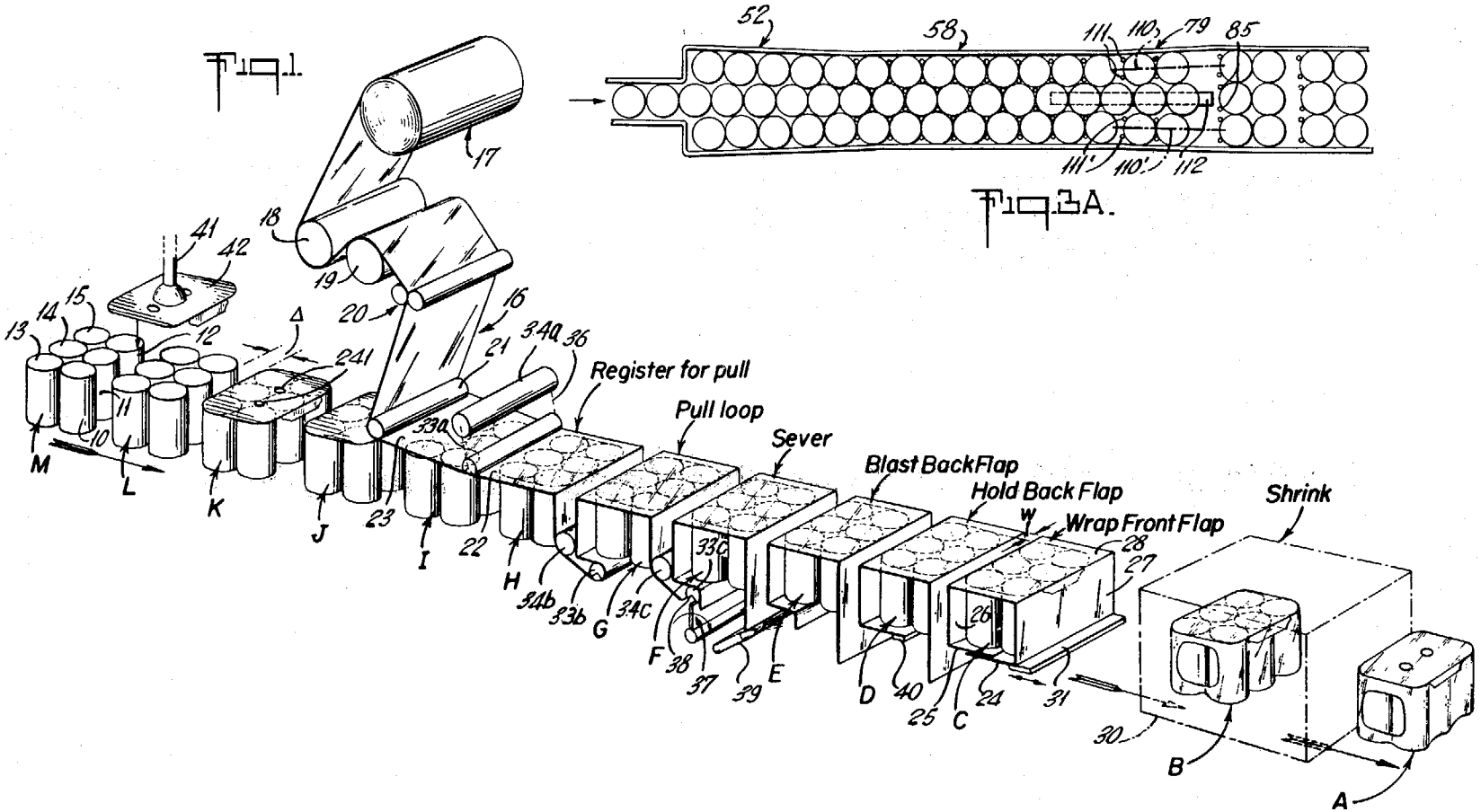
FIG. 1 is a simplified view in perspective showing elements and steps of the invention, in application to successive container clusters on a production line before, during, and after completion of packaging.
FIG. 3A is a view similar to FIG. 3 to illustrate a modification.

FIG. 1 serves for an introduction to the packaging process, in general terms, and in the showing of FIG. 1 it will be understood that there has been great simplification, to permit best viewing of the packaging steps.

The longitudinal arrows at both ends of FIG. 1 connote left-to-right movement of a succession of clusters A, B, C . . . . . M along conveying means (not shown), in the course of which movement packaging is accomplished, to the condition suggested by the overall appearance of the package A, at the terminal end of the process. Each cluster, such as the cluster M, comprises two adjacent rows of like cylindrical containers 10–11–12–13–14–15, aligned three-abreast and transverse to the direction of conveyor movement. The formation of such clusters is later described in connection with FIGS. 2 to 4, which mechanism delivers the clusters in closely nested adjacency and with uniform spacing Δ between adjacent clusters. This spacing Δ, and the speed of cluster movement along the conveyor, are both maintained throughout the sheet-wrapping phase.

Material 16 for sheet wrapping is supplied from a reel or magazine 17 which may be suitably suspended over the moving clusters, on a rotary axis transverse to conveyor movement. Tensioning, positioning, and other pay-out control roller elements 18–19–20–21 bring the sheet material down into proximity with the adjacent end plane of the clusters, to enable an elongated pay-out of the same, over one or more clusters, as suggested by the stretches 22–23 which are seen to overstand clusters H and I. Preferably, the material 16 is a shrinkable plastic, and I have achieved satisfactory results using commercially available polyethylene film, of 1 or 2-mil gauge, and longitudinally extruded, so that the predominant shrink axis is longitudinal, in the sense of pay-out direction and in the sense of cluster movement.

In the present illustrative case, the wrapping comprises the peripheral enclosure of each cluster with a single cut-off piece of the sheet 16, as best illustrated for the cluster C, where the single sheet is formed into overlapping bottom flaps or ends 24–25, contiguous to side panels 26–27 and to a smooth, continuous top panel 28. The width of the sheet 16 exceeds the overall width of the clusters, to the extent W at both ends, the pay-out stretch 22–23 having been symmetrically positioned astride the path of cluster movement. It will be understood that at the fully-enveloped state (cluster C), the weight of containers (against supporting elements of the conveyor, not shown) is sufficient to hold the flaps 24–25 in overlapped register as the wrapped cluster passes to an oven 30; in the form shown, the speed of feed elements to the oven 30 exceeds that of feed elements which are operative in the wrapping phase, and a reciprocating shuttle plate 31 is suggestive of means aiding the transition of wrapped clusters from one set of feed elements to the next. Once in the oven, the overlapped ends 24–25 become fused and the projecting ends of the sheet material reduce to conform to the cluster contour, including the end contour, all as more fully set forth in my co-pending application, Ser. No. 29,127, filed Apr. 16, 1970. The more rapid feed of wrapped clusters in the oven 30 enables their expanded spacing, as shown, and the finished article quickly exits for cooling to room temperature, permanently tensed, bonded, and shrunk, as for the package A.

In accordance with the invention, efficient single-sheet wrapping of the character indicated is accomplished by the coordinated vertical and horizontal components of displacement of loop-forming means such as a transversely extending bar, which may be one of a series [33–34–35] *33a through 33j* carried by a linked endless system, not shown in FIG. 1. Each bar [33–34–35] *33a through 33j* may be articulated in its connection to the endless system, and a cluster-spacing bar member [33–34–35] *34a through 34j* may be provided at each such pivotal connection, the rigid spacing and end connection of corresponding bar members being suggested by dashed lines 36 [, for the case of bar members 35—35′].

In the cycle of synchronized coaction between pairs of bar members and the successive clusters, the loop-forming bar [(35)] (*33c*) is initially brought into tensing contact with the span 22–23 of sheet material, in vertical registration with the space Δ between adjacent clusters (H–I), thus stretching the span 22 over the top of the leading cluster (H) as it descends into the space Δ. As bar [35] *33c* descends, it pulls new sheet material as a tensed loop through and beyond the vertical limit of the space Δ and, in the course of such descent it is followed by the corresponding spacer bar [(35′)] (*34c*), of diameter (substantially Δ) to assure maintenance of the space Δ.

Once the loop-forming bar has passed through the space Δ, it is caused to accelerate forward to stretch the sheet in the direction of applying bottom-flap material under the bottoms of the second or trailing row of containers (13–14–15) of the forward cluster. In FIG. 1, this situation is illustrated by the pair of bars [34—34′] *33d–34d*, operative upon the adjacent clusters G–H, and at a time when both bars [34—34′] *33d—34d* have matched the speed and direction of cluster transport; the bar 34 has pulled out the loop of sheet to the maximum extent and is supporting containers 13–14–15 with bottom-flap material pinched by the weight of these containers. The spacer bar [34′] *34d* is at its lower-most position, acting to retain the spacing Δ at contact with the lower parts of adjacent clusters (G–H); at the same time, spacer bar [34′] *34d* assures that the two halves of the loop will be kept tensed against and over adjacent cluster side areas, to define what will become the back panel 26 of the forward cluster G and the front panel 27 of the next succeeding cluster H.

Having defined, extended and stretched the sheet loop, while necessarily performing part of the wrap on each of two adjacent clusters, the loop is severed at substantially its midpoint. This moment is illustrated in FIG. 1 for the case of bars [33—33′] *33e–34e* coacting with adjacent clusters F–G. Cut-off is schematically indicated by a rotary element 37, extending transversely of and driven in synchronism with conveyor movement, to cut across the sheet where it spans a groove 38. Such a groove 38 is formed in each loop-forming bar and is oriented downwardly open when the loop-forming bar is in its most-forward position, as for bar 33 in FIG. 1.

Having severed the sheet, the forward cluster F is now free of paid out material, and means symbolized by a directional air-blast device 39 is operative upon the severed rear flap (25) to lay the same flap over the bottom end of the cluster to the extent that it will so reach. In FIG. 1, the air blast device 39 is shown at the instant of commencing action upon the severed flap beneath cluster E, and once the flap is laid flat, a suitable flap-retaining member holds the position. In FIG. 1, the flap-retaining member 40 is shown performing this function on cluster D; member 40 will be understood to be part of the conveyor system, so that flap-retention continues. The remaining enveloping operation involves backward folding of the bottom flap (24) into overlap with the flap 25 and may be accomplished by stationary means (not shown) encountered upon forward conveyor progress of the clusters, as for example between the stages represented by clusters D and C in FIG. 1. In the course of developing this overlap, the retaining member 40 is withdrawn by suitable means (not shown).

The described continuous-wrapping procedure will be understood to take place without any interruption or change of pace in the movement of clusters through the zone represented by clusters J to C in FIG. 1. At the same time, the pay-out of sheet material from the supply 17 may involve a smoothed and continuous rotation, as by synchronizing displacement of a tension roll (19) in accordance with the transient needs of the loop pull-out bar for each successive cluster.

FIG. 1 additionally illustrates an optional packaging feature of the invention wherein, if desired, the wrap may incorporate additional material such as a promotional display panel, marketing premium, or the like beneath the top panel 28 of the shrink wrap. For this purpose, suitable handling means 41 is reciprocated in synchronism with conveyor advance of successive clusters and is operative to place a paperboard panel 42 (shown with stiffening side flanges 43) in register with the top ends of the containers; a new such top panel 42 may be so positioned and applied to each successive cluster. In FIG. 1, such a panel has been completely applied to the clusters K–J and all preceding clusters, but the panel 42 is in the process of being applied to the cluster L.

CONTAINER GROUPING

Figures 2, 3, 4:
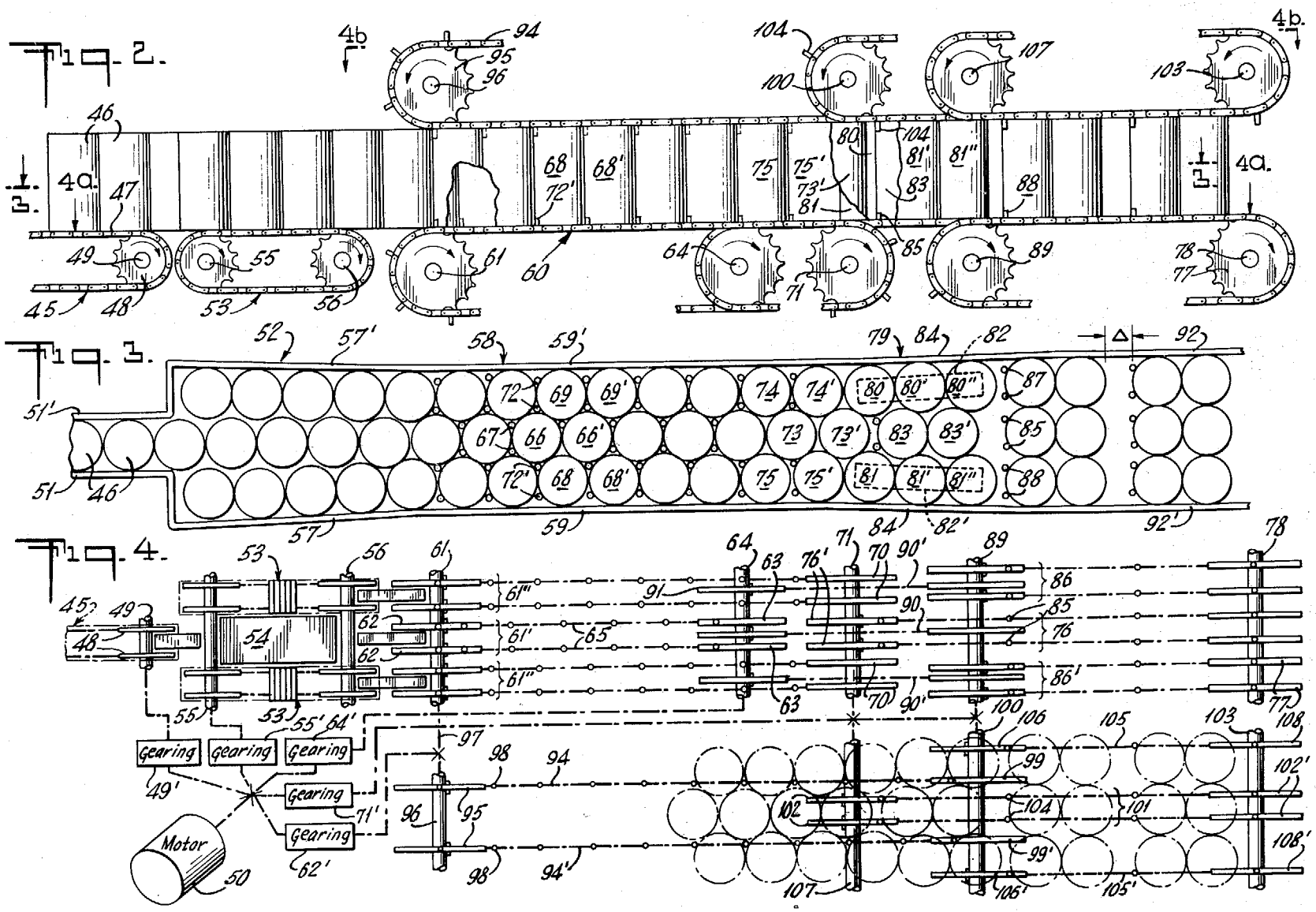
FIG. 2 is a simplified fragmentary view in elevation of conveyor parts in the cluster-forming portion of the equipment.
FIG. 3 is a simplified plan view, taken substantially from the aspect 3—3 of FIG. 2.
FIG. 4 is a diagrammatic view, involving schematically interconnected lower and upper drives for mechanism shown in simplified plan, taken respectively from the aspects 4a—4a and 4b—4b of FIG 2.

As indicated generally above, I provide novel methods and means accepting a steady stream of input containers and converting this stream into the indicated succession of spaced clusters exemplified by the adjacent clusters M–L in FIG. 1 and with the regular spacing Δ. The mechanism for accomplishing this is schematically indicated in FIGS. 2, 3 and 4. For the situation in which the steady stream of incoming containers is received via a single-file conveyor, best seen on the left end of FIG. 3, this conveyor comprises an endless loop 45 of linked elements establishing a plane of support for the containers 46 upon its upper span 47. Spaced sprockets 48 on a shaft 49 drive the conveyor 45 at a rate adequate for the capacity of the machine. Such drive is schematically indicated by the motor 50 with a suitable gear connection 49′ to the shaft 49. Fixed side rails 51—51′ pilot the container bodies to assure the described single-file movement.

The single-file supply of containers enters an enlarged region 52 of the conveyor system, wherein containers are allowed to find their own transverse positions, consistent with the container capacity of the region 52. Within this region, another section 53 of the conveyor system operates to support the containers and to urge them forwardly, i.e., in the direction to the right in the sense of FIGS. 2 to 4. As shown in FIG. 4, the conveyor system serving the region 52 comprises two like conveyors 53—53′ which are laterally spaced on opposite sides of a smooth table or shoe plate 54 and which are driven alike from a common shaft 55 and suitable gearing 55′ connected to the motor 50.

The enlarged region 52 is characterized by side walls or rails 57—57′ which converge into a constricted region 58, the walls 57—57′ being shown continuously connected to or formed with the rails 59—59′ of region 58. In the region 58, the containers assume a honeycomb or diamond-shaped nested relation; preferably, the space between the rails 59—59′, which defines the constricted region 58, is greater than twice the effective diameter of the containers but less than three times that diameter. Of course, the density with which containers may be packed into the constricted zone 58 will depend upon the particular spacing of side rails 59—59′ within the stated range, and it is my preference that this density be as great as may be gracefully accommodated by the mechanism, namely, by spacing rails 59—59′ generally in the more restricted range of 2.5 to 2.8 times the effective container-body diameter. More specifically, I prefer that this range be between 2.7 and 2.75 for the case of conventional 12-oz. or 16-oz. cylindrical containers as shown.

Throughout the constricted zone 58, container-supporting conveyor means 60 is continuously operative but is positive and direct in its positioning engagement with individual containers, thus assuring control of the development of the desired honeycomb pattern in the region 58. Drive to the container 60 is provided by a shaft 61 to which plural drive sprockets are keyed, and shaft 61 may be driven by the motor 50 through suitable gearing 62′. In the form shown, three separate conveyors operate in zone 58; all of them are driven from the common shaft 61. The first of these conveyors is identified 61′ in FIG. 4 and comprises two spaced sprockets 62 with matching idler sprockets 63 free to rotate on a forward shaft 64. Linked endless chains 65 are spaced less than container diameter and are carried by the sprockets systems 62–63, being positioned symmetrically astride the center of the alignment of central containers 66—66′ in the constricted zone 58. Spaced locating lugs form part of each of these chain system 65 at matching locations along the respective chains. In FIG. 4, these locations are symbolized by small circles in the series of dashed lines, suggestive of the alignment of chains 65. These lugs are identified at 67 in FIG. 3 immediately behind each of the containers 66 in the central alignment, and the lugs 67 will be seen to bear symmetrically upon laterally spaced regions of the trailing arc of the surface of each central container body.

The conveyor system in the constricted zone 58 comprises two smaller pairs of chain systems 61″ serving the respective outboard alignments of containers such as containers 68—68′ and 69—69′ in FIG. 3. The chain systems 61″ are in all respects the same as described for the systems 61′ except for their outboard locations and except for the fact that they extend longitudinally further than the systems 61', being run over idler sprockets 70 carried by a further shaft 71. Drive to the systems 61'' may be from sprockets (not identified) but keyed to the same shaft 61 as that described for the drive sprockets 62, and the chains of systems 61'' may carry spaced pairs of lugs, such as lugs 72 (FIG. 3) for the outer-container alignment 69—69' etc., and similar lugs 72' for the other alignment of outer containers 68—68', etc. The transverse alignment of lugs 72—72' for corresponding containers of the outer-container alignments (68—68', 69—69') are interlaced with or longitudinally offset from the lugs 67 for advancing the central alignment of containers (66—66') and the degree of offset is such as to assure positive advancing thrust for each container in the region 58, i.e., between shafts 61 and 64. Beyond the location of shaft 64, the center drive 61' terminates but central containers 73—73' are nevertheless continuously and positively advanced by reason of symmetrical edge contact (at their rear sides) with adjacent containers 74—74' and 75–75' of the respective outer alignments.

The constricted region 58 ends essentially at the location of shaft 71, at which point a new pair of centrally aligned endless conveyor chains 76 assumes advancing control. The chains 76 are driven by spaced sprockets 76' keyed to the shaft 71 which in turn is driven by motor 50 through suitable gearing 71'. The other end of the chain system 76 runs over idler sprockets 77 on a shaft 78, which may represent the location of discharge of conveyed clusters of containers to the package-wrapping zone of the machine. The gearing 71' which accounts for the drive of the chain system 76 preferably operates at a greater speed of advance than that which governs conveyor advance through the constricted zone 58; this increased speed enables development of the space Δ between clusters, as will be explained.

As the space Δ is being developed, the outer containers are retarded with respect to the centrally aligned containers, to achieve the three-abreast transverse alignments needed for the ultimate cluster formation. This process takes place in a divergent zone 79, wherein positive drive to the outer aligned containers is dropped and wherein the outer containers 80—80'—80'' and 81—81'—81'' may merely slide or drag over supporting shoes or platens 82—82' as the forward thrust from centrally aligned containers 83—83' urges them outwardly to the limiting rails 84 of the divergent zone 79.

In the chain system 76, a container-engaging lugs 85 are longitudinally spaced to a greater extent than in the chain systems 61'—61''. This greater longitudinal extent amounts to substantially the spacing between cluster rows, plus the number of container diameters which corresponds with the number of rows to be wrapped in a cluster. In the form shown, double rows (2×3 six-packs) are thus wrapped, and the longitudinal spacing between pairs of lugs 85 on the chain system 76 is substantially twice the effective container diameter, plus the space Δ. In the course of movement through the diverging zone 79, the sliding outer containers 80'—80'' and 81'—81'' are actually accelerated by the faster drive via their central counterparts (83—83') but they drag and thus become effectively retarded with respect to the positive advance of the centrally aligned containers 83—83', to the point where there is transverse alignment of all three containers, e.g., 80'—83—81' and 80''—83'—81'' of the two rows constituting the cluster grouping. This event occurs when the divergence between side rails 84 substantially matches three times the effective container diameter. From this point onward, positive feeding advance may be imparted to the thus-aligned outer container pairs in order to maintain cluster grouping and registration. In FIG. 3, additional like outboard-container-advancing chain systems 86—86' (with container-advancing lugs 87—88) have matched alignments beyond the location of their drive shaft 89, and because of the synchronized relation between drives to chain systems 76—86—86', the shafts 71—89 are both shown connected to motor 50 via the same gearing 71'.

In the region of transition between the slower feed of conveyor 65 and the faster feed of conveyor 76, the centrally aligned containers may be supported by a fixed plate or shoe (not shown) or by a short central supplementary chain system 90. Chain system 90 spans sprockets on shafts 64—89 and is not equipped with container-engaging lugs; it is driven from shaft 64 via gearing 64', which may match the gearing 62' so as to impart no speed changes to the centrally aligned containers.

In like manner, and if desired, the drag shoes or plates 82—82' may be considered optional and be replaced by supplementary chain systems 90', spanning sprockets on the shafts 64—89, and also driven from the shaft 64. As with chain system 90, the system 90' have no container-engaging lugs, and are located between the conveyor-chain pairs which serve their respective alignments of containers.

It will be understood that the shaft 78 serves idler sprockets for all the chain systems 75—86—86' in the region in which fully grouped "2×3" clusters are being conveyed at spacings Δ. In this region, the spaced side rails are unnecessary in that the lugs 85—87—88 presumably have full control over the cluster arrays. However, I show and prefer the continuous extension of the side-rail system as shown at 92—92', to provide positive assurance of laterally retained cluster groupings. The spacing between rails 92—92' is necessarily substantially three times the effective container diameter, plus a small amount for clearance purposes.

The described mechanism is basically adequate to assure the desired result of automatically grouping clusters three containers wide in each of two rows, as long as an adequate supply of containers 46 is forthcoming at the inlet to the converging zone 52. The longitudinal extent of the converging zone 52 is adequate to assure that containers of the central alignment will not retain purely dead-center alignment but rather will distribute successive containers to the right and left of the central alignment, to the extent that an adequate and full supply of containers is always on hand in the convergent zone 52. The density of compaction of the nested containers on entry into the constricted zone 58 will depend upon the particular selected spacing between side rails 59—59', and of course the longitudinal spacing between corresponding pairs of drive lugs 67 on the central chain system 61' (and also between corresponding pairs of lugs 72—72' on the outer chain systems 61'') will be selected appropriate to the constriction afforded by the spacing between rails 59—59'. For the densely compacted dimensioning display in FIG. 3, the center-container-advancing lugs 67 are interlaced substantially one half the distance between spacings of corresponding lugs 72—72' in the outer conveyor system 61''.

Although the described system will adequately segregate and position clusters as indicated, I prefer to maintain even further assurance of cluster formation and positioning control by providing overhead chain systems, synchronized with their counterparts which lie beneath the plane of support of the passing containers. The overhead chain systems are schematically indicated in the bottom half of FIG. 4 and are shown to have common drive connections to their already described counterparts beneath the containers. For example, in the constricted zone 58 two spaced conveyor chains 94—94' are driven by sprockets 95 keyed to the overhead driveshaft 96, shown having a direct interconnection 97 to the lower driveshaft 61; the chain systems 94—94' are completed by passage over idler sprockets 99—99' at an overhead shaft 100 directly above the shaft 89. Lugs 98—98' on the chain systems 94—94' have spacings corresponding to those between successive lugs 72 and successive lugs 72', so that the lugs 98—98' will engage parts of the outer aligned containers in the constricted zone 58. It will be noted that even though chain systems 94—94' overlap the diverging zone 79, where outer containers are laterally spread as central containers accelerate, this presents no problem since the movement of the outer containers is in the direction away from engagement with lugs 98—98' in this zone. Of course, further overhead lug-bearing conveyor chains can be added to provide even further container-positioning assurance, but I find this unnecessary.

Also overlapping the diverging zone 79 is a central pair of overhead chain-drive systems 101, driven by sprockets keyed to a shaft 107 having a synchronized connection to the shaft 71, and the down-stream end of these chain systems 101 rides idler sprockets 102 on an overhead shaft 103, above the shaft 78. Lugs 104 on the chain system 101 are spaced in accordance with lugs 85 on the corresponding lower chain systems 75. To complete the description of the overhead system, final outboard chain systems 105—105' register with the outer of systems 86—86' and carry lugs 106—106' in transversely aligned relation both with the lugs 104 and the lugs 85—87—88 of the system beneath the containers. Drive to the chain systems 105—105' is by a sprocket (not identified) on the overhead driveshaft 107, directly synchronized with the corresponding driveshaft 89 beneath the plane of container support, and these chain systems utilize idler sprockets 108—108' on the final overhead shaft 103.

In the clustering systems thus far described, aligned groupings of containers three abreast are achieved by allowing the outer aligned containers to effectively retard, drag or slip back with respect to the accelerating faster advance of their adjacent central containers, and this occurs during the passage or flow of containers through the diverging zone 79. FIG. 3A illustrates an alternative wherein the desired cluster result is achieved by positively accelerating the advance of corresponding containers in the outer alignments while permitting containers in the central alignment to effectively retard or drop back. Thus, in FIG. 3A, the heavy phantom alignments 110—110' will be understood schematically to indicate slightly divergent like and synchronized container-advancing chain systems throughout the diverging zone, and each one of these chain systems includes suitable spaced pairs of container-advancing lugs (as at 111—111') to assure positive advance at the correct speed and in the correct direction for these outer alignments of containers in the diverging zone 79. In this zone, the centrally aligned containers may optionally have a slip drive in the manner discussed for the slip drive mechanisms 90—90' of FIG. 4, or a supporting shoe plate 112 may carry the central containers as they retard with respect to advance of the outer conveyors 110—110'. At discharge from the diverging zone 79, the transverse rows of clustered containers are correctly aligned, and lugs 85 of the central chain systems 75 may pick up and govern ensuing displacement of the central containers in the successive clusters, all containers then being driven at the same accelerated speed appropriate to definition of the desired space Δ between clusters, as previously described.

CLUSTER-WRAPPING

The overall wrapping procedure has been generally described in connection with FIG. 1, and to simplify that description conveyor parts, supporting elements and drive elements were omitted. The overall organization and relation of these parts, in conjunction with the developing wrap, will be described in connection with FIGS. 5 and 6, the latter of which shows both synchronized overhead-driven systems and synchronized driven systems beneath the plane of container support. Reference will also be made to FIG. 7 which shows substantially greater detail for mechanisms beneath the plane of container support (at an instant of time later than depicted in FIG. 6), and to the various cross-sectional views of FIGS. 10, 11, 12 and 13, which represent vertical sectional views at different longitudinally spaced locations within the wrapping region. The detailed nature of guides and controls for the overhead elements will thereafter be described in connection with FIGS. 14, 15 and 16. The container clusters in these figures illustrate successive steps and are generally designated by successive markings T, U, V . . . . . Z.

Figures 5, 6:
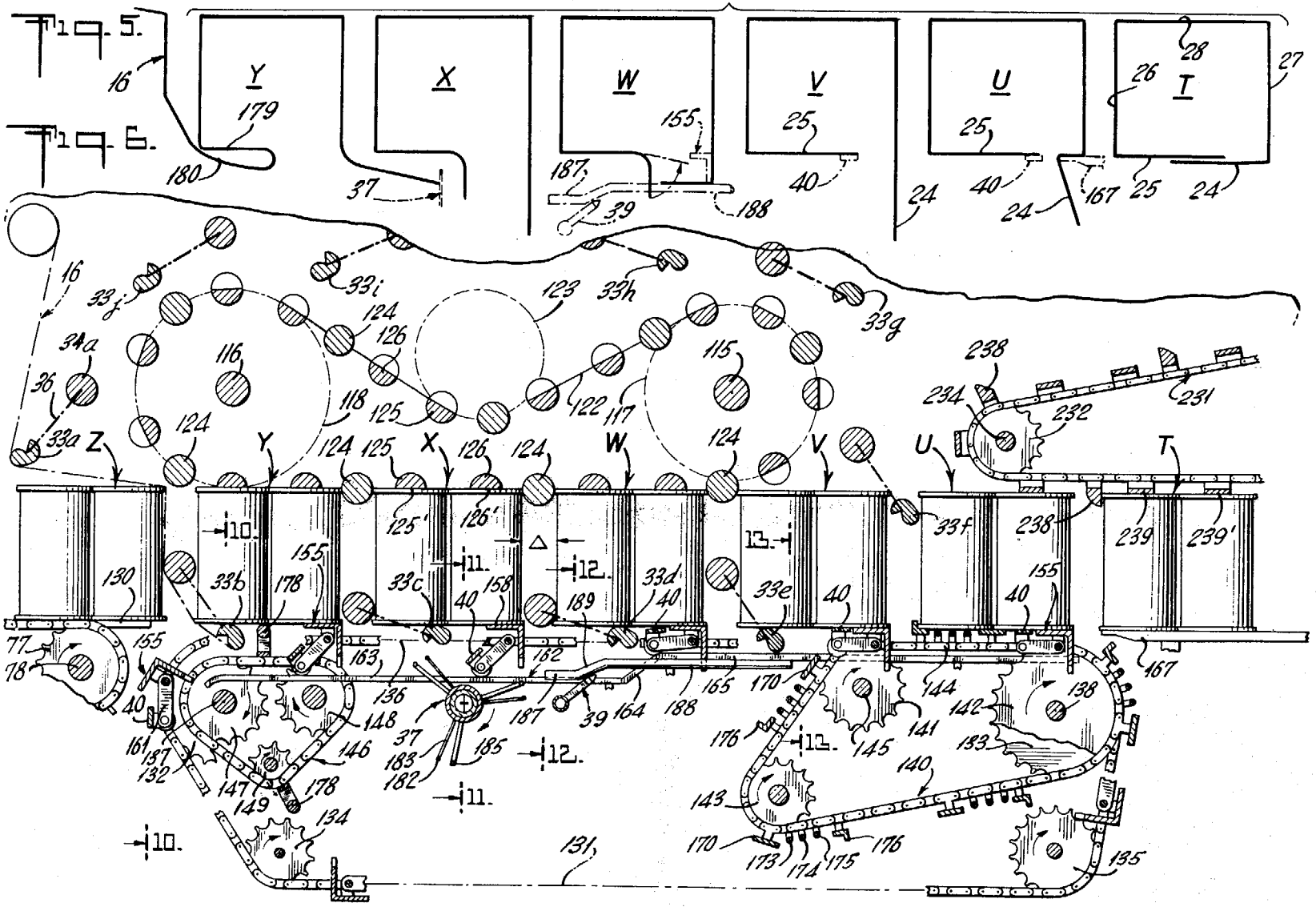
FIG. 5 is a simplified view in side elevation, to show progressive development of wrapping material using the method of FIG. 1.
FIGS. 6 and 6A are longitudinal vertical-sectional views on the same scale through packaging mechanism of the invention, FIG. 6 being concerned with wrapping per se, and FIG. 6A being concerned with post-wrapping operation.

By way of introduction, it suffices to say that in the packaging region the overhead components comprise two endless linked systems, for which the linkages have been omitted in FIG. 6 for purposes of clarity. A first such system employs like endless chains running over like spaced sprocket systems, utilizing a driveshaft 115 and an idler or undriven shaft 116. Each of these shafts is positioned just above the upper end plate of the containers and extends transversely of the direction of conveyor transport. Drive sprockets 117 on the shaft 115 are positioned just outside the transverse limits of the containers of the passing clusters; similar sprockets 118 are free to rotate between locating collars 119 —119' on the shaft 116, which is shown fixedly supported in upstanding side frames 120—121 of the machine frame (see FIG. 10). The chain systems 122 which connect corresponding drive and idler sprockets 117—118 on the respective sides of the path of container movement are tensed by suitable means (suggested at 123) so that the lower span of each of the chain courses is in substantial register with the plane of the upper ends of the passing clusters.

Systems of transverse bars connect the two chain systems 122 to perform two functions on the passing container clusters. A first series of transverse bars 124 is fixed to the chain systems 122 at longitudinal spacings corresponding to the space between corresponding parts of successive container clusters, namely, substantially twice container diameter, plus the distance Δ between clusters; the bar 124 may thus be and preferably are of a diameter substantially equal to the spacing Δ, and for the type of containers depicted in FIGS. 6 and 7, bars 124 locate adjacent upper chimes at diametrically opposite alignments on successive bars 124. Between the spacer bars 124, the chain systems 122 carry further transverse bar systems 125—126; the same being spaced from each other and from adjacent spacer bars 124, to the extent assuring substantially central vertical overlapping register with the aligned rear and front containers of each passing cluster. The bars 125—126 are truncated or flattened on one side and are thus characterized by substantially semi-circular cross-section, with flattened hold-down surfaces 125'—126' to engage central transverse alignments of the respective rows of passing containers. The drive shaft 115 will be understood to receive steady propulsion through synchronized gearing or other mechanism, referenced to the drive motor 50. Thus, with particular reference to FIG. 6, constant speed drive to the conveyor system, including the overhead spacing and retaining mechanism just described at 124—125—126, will assure continuous mesh with and location of the tops of all passing containers in a limited region approximately three clusters long, along the conveyor mechanism.

Before proceeding with description of mechanism beneath the plane of container support, it should be noted that the shafts 115–116 perform additional supporting functions for like chain systems by means of which the loop-forming bars [33] *33a through 33j* and their associated spacer bars [33'] *34a through 34j* are conveyed. Actually, the positioning of these bars [33—33'] *33a through 33j–34a through 34j* involves still further mechanism to be later described, but it suffices to identify in FIG. 10 idler sprockets 127 located between collars 128—128', at outboard locations on the shaft 116, i.e., outboard of the idler sprockets 118 and within the confines of the frame members 120–121. In FIG. 10, these further chain systems (serving the bars *33a through 33j–34a through 34j* [33—33']) are schematically identified at 129. The flight and guidance of the chain systems 129, in conjunction with fixed cams and other control devices to be later described, determine a continuous course of movement of bars *33a through 33j* [33] in the manner described in FIG. 1, i.e., (a) for pulling successive loops of sheet material, (b) for thereafter retracting through the space between adjacent clusters, followed (c) by rising above the path of container movement and around the sprocket system associated with shaft 115, (d) for return back over the sprocket systems 122, and then (e) to repeat the cycle upon interception of sheet material 16 for pull out of the next-successive loop between the next successive adjacent clusters. In FIG. 6, successive lower-case subscripts identify the succession of bars [33] *33a through 33j* for loop pull-out and bars [33] *34a through 34j* for cluster-spacing, and the rigid interconnection of corresponding bars [33—33'] *33a through 33j—34a through 34j* is again suggested by dashed lines, identified 36.

Beneath the plane of container support, cluster wrapping and support are assisted by a system of several different endless-chain drives with associated transversely extending supports, all of which are driven in synchronism with the basic conveyor drive and which operate in interlaced relation with the movement of the loop-forming bars [33] *33a through 33j* to assure positive retention of cluster position throughout the course of constant-speed transport, from the beginning to the end of the packaging phase. This phase begins with discharge from the cluster-forming transport mechanism, symbolized in FIG. 6 by the end sprocket 77 and shaft 78, and a suitable guide shoe or plate 130 at the end of the cluster-forming conveyor provides smooth transition of cluster support as the same is transferred to the various interlaced conveyor sub-systems beneath the path of container movement.

In FIG. 6, these sub-systems are seen to comprise, first, a large loop of transversely spaced chains 131, guided over spaced upper sprockets 132—133 and spaced lower sprockets 134—135. The upper span 136 of these chain systems is aligned just beneath the level of container support and in FIG. 6 is seen to extend substantially five cluster lengths, between the shaft positions 137 (for sprockets 132) and 138 (for sprockets 133). A second pair of endless-chain systems 140 is guided over more closely spaced sprockets 141—142 and a third lower sprocket 143. The upper span 144 of these chain systems is substantially the spacing between corresponding parts of adjacent clusters, being defined between shaft 138 for the sprocket 142 and shaft 145 for the sprocket 141. A third and still smaller endless-chain system 146 runs its course over still more closely spaced upper sprockets 147—148 and over a lower sprocket 149. The sprocket 147 shares shaft 137 along with sprocket 132. As seen in FIG. 10, the shaft 137 is a driveshaft, journalled at 150 in the frame members 120—121, and having a rearwardly projecting end 137' to which suitable motor-drive connections (not shown) may be made. The sprockets 147 of the small endless-chain systems 146 are positioned axially inwardly of the drive sprockets 132 served by the same drive shaft 137, but as will be later pointed out, the chain systems 146 are driven at 148, so that sprockets 147 idle on shaft 137.

The flights of the larger endless-chain systems 131 are outside of those of systems 146, so that transverse members connecting corresponding points along the smaller chain systems 146 may pass freely within the volume of the locus of movement of transversely extending members carried by the larger and outer chain systems 131. In similar fashion, the locus of movement of transversely extending members carried by the other smaller chain systems 140, near the terminal phase of packaging, is fully contained within the locus of movement of the transversely extending members carried by the larger chain systems 131.

Having thus identified the three pairs of endless-chain systems 131—140—146, the various transverse container-positioning elements carried by three systems will be identified.

The large endless loops 131 provide the function of supporting the forward edge or half of the forward transverse container alignment of all clusters passing through the packaging region. Thus, transverse members 155 include outwardly projecting sections or members 156 (FIGS. 10, 11) each of which carries a bracket 157 which may be part of one link in the outer chain system 131. In the region of container support, these members are defined by an extensive horizontal surface 158 and an extensive vertical surface 159. Along its upper stretch 136, the chain system 131 is guided along a suitable horizontal rail system schematically indicated at 160 in FIG. 11, thus assuring constancy of the plane of support of forward ends of all clusters. Pivoted to each of the bar systems 155, and in the central region beneath the path of the passing container clusters, is a rocker-arm system including arms 161 at an offset location of which the flap-retaining bar 40 is carried. The path of movement of the bar systems 155 follows the course of the upper span 136 of the chain systems 131, so that surfaces 158 constantly locate containers in the support plane. The flap-retention bar 40 is, however, not needed until near the end of the wrapping process and its position is determined by a fixed elongated guide shoe or cam 162 having a first horizontal stretch 163 substantially spaced from the plane of cluster support and therefore determining a retracted position of the flap-retaining bar 40. The stretch 163 is joined to a ramp 164, leading to an elevated stretch 165 extending the remaining length of the span 136; flap-retaining this elevated stretch 165, a roll 166 beneath the flap retaining bar [140] *40* tracks cam 162 to elevate the position of each successive bar 40 into flap-retaining relation with a rear flap 25, squeezing the same against the rear half of the forward transversely aligned containers of each container cluster. In FIG. 7, this relationship will most clearly be seen immediately forward of the plane 12—12, upon which FIG. 12 is based. Flap-retention continues throughout the remaining course of the chain span 136. In FIG. 7, the flap 25 is just beginning to be released from support by the bar 40 at the lower right-hand corner of the diagram. This occurs at the instant of time when continued conveyor movement will advance the same cluster into temporarily supported relation with a shoe plate 167 which accounts for backwardly folded guidance of the leading flap 24 of the envelope. It will be understood that container movement is so rapid along the conveyor system that no practical opportunity is afforded for loss of positioning control of the rear flap 25 prior to overlapping registration by the forward flap 24, as the cluster moves off the chain system 131.

The function of the chain systems 140 at the terminal phase of wrapping operations is to provide supplementary support for the container clusters as control by other elements is relinquished. The supporting elements carried by chain systems 140 are shown to comprise five transverse elements, per cluster supported. The leading one of these elements is a transverse bar or plate 170 rigidly carried by a link 171, with a suitable offset 172 to determine the positioning of plate 170 in the bottom plane of container clusters, when each such bar or plate 170 achieves the upper span 144. Synchronization of chain systems 140 with chain systems 131 is such that plates 170 feed in interlaced relation with flap-holding bars 40 carried with the chain system 131, and the width of bars 170 is adequate to substantially overlap parts of the bottoms of all containers in each cluster. The bars 170 are immediately followed by a series of three further bars or rods 173–174–175 each rigidly connected to a different link in the chain systems 140. At the position of cluster U in FIG. 7, these bars 173–174–75 are seen to support the central region of the trailing set of three containers in the cluster. The final supporting element 176 in each set of supporting elements carried by the chain systems 140 is an elongated angle member or bracket having a flat surface which horizontally aligns with the support plane of members 170–173–174–175 when running the upper span 144, as shown for the cluster U in FIG. 7. Members 176 also include an upstanding back edge into which the trailing lower edges of each cluster may locate to accomplish positive and accurately spaced displacement of successive clusters. The location of shaft 145, which determines the upstream end of the span 144, is selected to clear the loop-forming bars [33] *33a through 33j* as they cease their forward motion and begin to retract; in the case of cluster V in FIG. 7, the loop-forming bar [33] *33e* is still supporting the rear half of the cluster as the elements 170–173–174–175–176 are coming into position to relieve the retracting bar [33] *33e.* The relation of parts at cluster V in FIG. 7 also serves to show the vertical retraction of spacer bar [33'] *34e* at its loop-forming bar [33] *33e* retards with respect to the advancing cluster V.

The function of the chain systems 146 (FIGS. 6 and 7) at the beginning phase of the wrapping functions is to provide supplementary support of the clusters in closely interlaced relation with the feed of the loop-forming bar [33] *33b* and of the forward support bars 155, and the length of chain systems 146 and its drive synchronization are such as to assure correct phase of support in terms of the timing of sequentially oncoming clusters; the further function of chain systems 146 is to provide transient support of the bottoms of rear containers in each cluster as such containers leave the support provided by shoe plate 130, and until the loop pull-out bar has been able to achieve bottom support for such containers. In the form shown, the chain systems 146 are of effective length to cycle once for every two passing clusters and therefore they merely carry two transverse support bars. Each bar 178 is integrally formed with corresponding opposed links in the respective chains 146 and projects sufficiently to establish a cluster-supporting function during its course of movement adjacent the locus of cluster movement. Each bar 178 precedes a loop-forming bar 33, *for example bar 33b* in providing bottom support of rear containers in each cluster, and since the bar [33] *33b* must necessarily have a forward speed greater than that of cluster movement, the drive of chain systems 146 must be faster than that of systems 131; such drive of systems 146 may be via the sprockets 148, the sprockets 147 being idly supported on shaft 137, as suggested by collar-retention of sprockets 147 (see FIG. 10).

The faster movement of bar 178 (i.e., faster than the movement of bars 155) is suggested in FIGS. 6 and 7. In FIG. 6, the bar 178 is supporting the forward portions of the trailing row of containers in the cluster Y, and the loop-forming bar [33] *33b* is assisting in such support; it will be appreciated that before bar [33] *33b* was able to provide such support, the bar 178 had engaged the bottoms of the same containers at a more rearward position, and before these containers had cleared the shoe plate 130. FIG. 7 depicts the parts at a later instant of time, again for the cluster Y, but when the bar 178 has transferred its supporting function to the rear portions of the bottoms of the forward row of containers in the cluster. At this instant, the loop pull-out bar [33] *33b* is in its full-forward relation with respect to the cluster (i.e., moving at cluster-transport speed), and the bar 178 is about to whip around sprockets 148, out of supporting relation with any containers. In making this whip retraction, the synchronized drive of bar 178 assures clearance with the adjacent flap-retainer bar 40.

FIG. 7 serves further to show, for the case of the cluster Y, that the downward position and diameter of the spacer bar [33'] *34b* are such, in relation to the proportions and offset of the loop-forming bar [33] *33b*, that the pulled loop of sheet material 179 applied against cluster Y just clears and therefore cannot foul the adjacent pulled span 180 of further loop material paid out from the supply 17. Moreover, as this material is paid out, a small clearance 181 between spacer bar [33'] *34b* and the adjacent forward edges of containers in the next-succeeding cluster Z assures that, in the course of loop formation, the loop material may be freely paid out and may slide over the rounded contour of bar [33'] *34b*.

Thus, the cluster Y is at all times fully supported, is continuously moving without retardation, and sheet material is taut across the downwardly facing mouth of the groove 38 of bar [33] *33b*, in readiness for cut-off.

In FIG. 7, the cluster X serves to illustrate the relation of parts substantially at the instant of cut-off. The rotary-cutter means 37 is driven in synchronism with advancing movement along the conveyor system and includes one or more transversely extending cutter elements or rods 182, paced to slightly enter each passing groove 38. In the form shown, coaction is achieved for each of three arms [182] *183*, at equally angularly spaced locations around the axis of cutter rotation. The cutter elements 182 are shown as electrical-resistance or heater wire, bent at offsetting end arms 183, and connected to suitable supply means, indicated by legend at the slip-ring connection 184 in FIG. 11. It has been previously indicated that the sheet material is thermally sensitive, and of course the wires 182 are sufficiently heated to achieve clean and rapid cut-off during the brief entry of elements 182 into the cut-off grooves 38. Further assurance of clean cut-off may be achieved by pressure bars 185, carried by the rotating cutter assembly at slightly greater radial offsets than the cutter assembly at slightly greater radial offsets than the cutter elements 182 and sufficiently trailing the same to avoid interference with the loop-forming bars [33] *33a through 33j*. At the instant depicted in FIG. 7, the upper such pressure bar 185 for the cluster X has depressed and locally increased tension in the sheet material span 180 at the precise moment when the adjacent cutter element 182 has locally softened the sheet material for cut-off purposes. Clean severance is thus assured, leaving the severed flap hanging as shown at 186, in solid outline for the cluster X, and in dashed outline for the phantom position of bar [33] *33d* (beneath the cluster W).

Between the positions shown in full in FIG. 7 for the successive clusters X–W, the cluster W will have passed an intermediate location suggested by the phantom outline of bar [33] *33d*. In this intermediate position, the hanging cut-off flap 186 encounters the upward and forwardly directed blast from the airblast means 39, causing the flap 186 to elevate, ahead of the loop-forming bar [33] *33d*, and to lie flat against the bottoms of the containers of cluster W. Thereafter, and by the time cluster W reaches the position shown in full in FIG. 7, the flap-holding bar 40 will have been raised by ramp 164 to the elevated position shown, retaining flap 25 at the cluster W.

Figure 11:
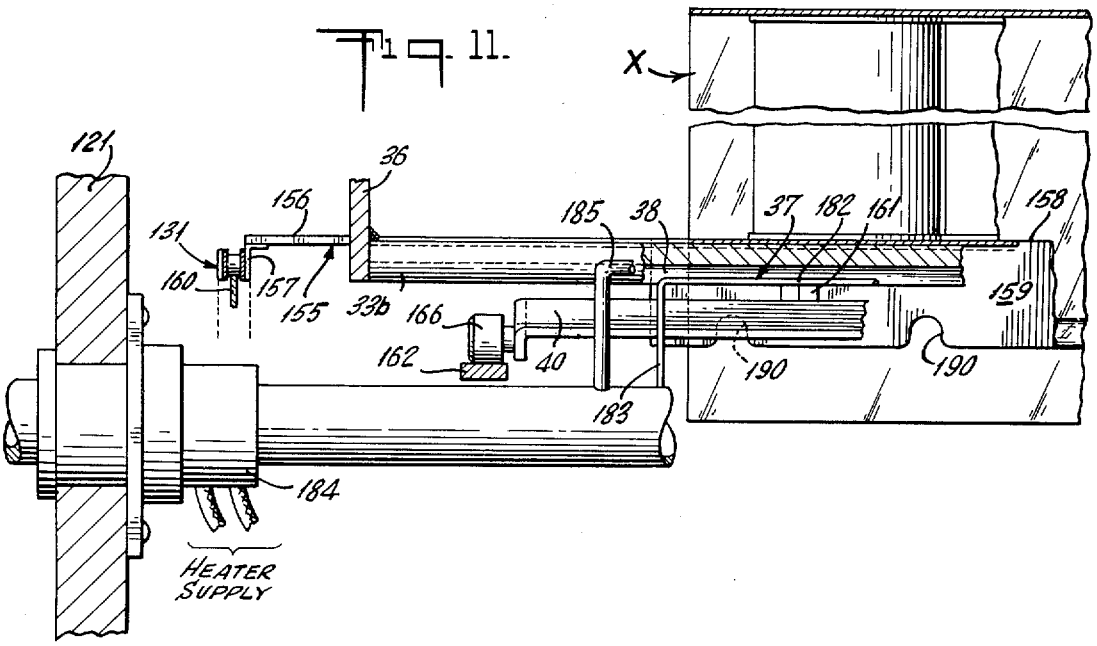
Figure 12:
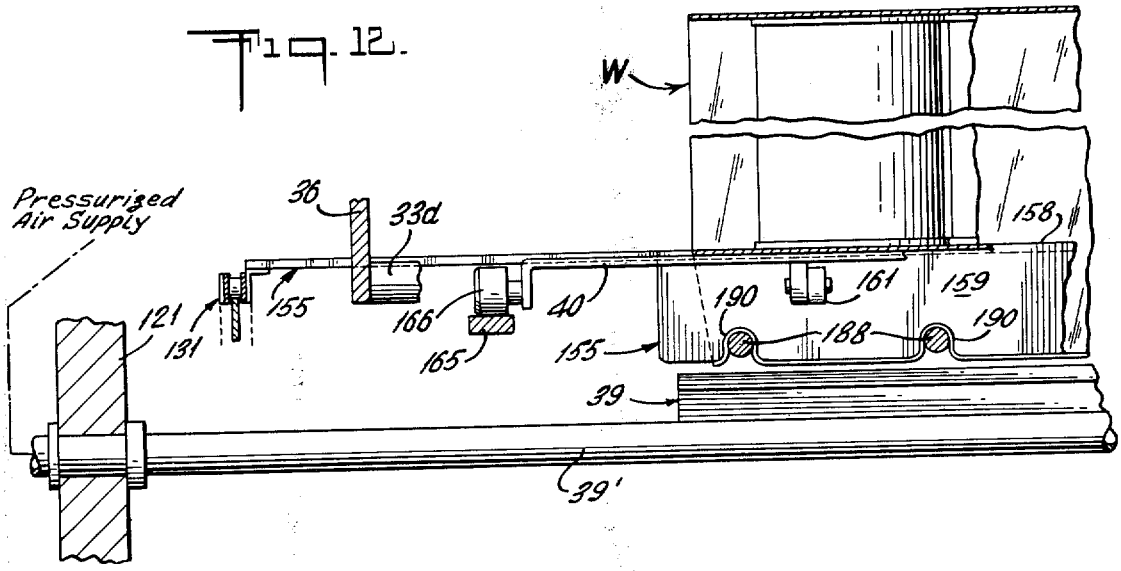
Figure 13:
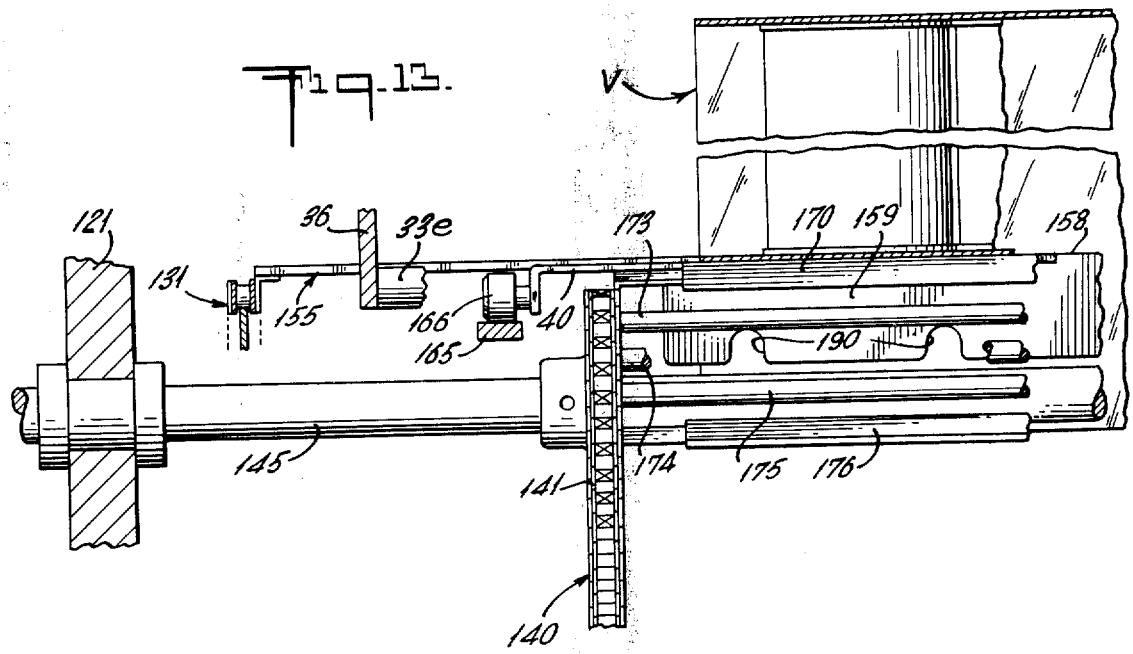

FIG. 7 and the related sectional diagrams of FIGS. 11, 12 and 13 serve additionally to show means for controlling the placement of the forward flap of sheet material, used to overlap the trailing flap 25. This forward flap has its origins at cut-off (cluster X), namely, at the span 180, and the directional arrow associated with the phantom outline 180' at cluster X shows that this forward flap material will tend to drop to a vertical position immediately after clearing the pressure bar 185. The severed forward flap 180 is intercepted by a system of elongated rods 187 which serve to drag the forward flaps of all clusters passing past the cut-off location; in the case of cluster X, interference with rods 187 has just commenced. Actually, the rod portion 187 is vertically offset below an upper elongated stretch thereof 188 which extends substantially to the operative region of chain systems 140, and a ramp or off-setting bend 189 connects the sections 187–188. At the raised elevation of the sections 188, each of these sections enters and clears a downwardly open slotted opening 190 in the flat vertical part 159 of each container-support member 155. Thus, as clusters advance from initial interfering relation (for flap material 180) with the lower offset ends of the bars 187, the front-flap material 180 is dragged and, upon encountering the ramp 189, is held within the clearance between the upper elongated rod sections 188 and the associated slotted parts 190 of the support members 155. In this condition, control over the forward flap 180 is retained during traverse of the air blast at 39. Once past the air-blast region, such control of the flap material 180 may be released, as for example to the dropped or vertically hanging position shown for the flap 180 at cluster V. It is only upon encountering the shoe plate 167 that the material at 180 begins to be laid along the bottom of the cluster to develop the overlapping bottom flap 24, as shown for cluster U in FIG. 7. The extension of cam rail 165 to the right, beyond the vertical plane of the last sprocket shaft 138, suggests continued control of the trailing flap 25 until its overlap by the forward flap 24 has actually commenced.

Thus far, the overhead elements of the wrapping mechanism have merely been alluded to in general terms. The loop-forming bars [33] *33a through 33j* and the spacer bars [33'] *34a through 34j* have been described in terms of their programmed coaction with cluster advance and with synchronized elements of support, holding and feeding mechanism beneath the plane of conveyor movement. FIGS. 14, 15 and 16 provide further detail on the overhead elements of the system.

Basic orientation and displacement of the pairs of bar elements [33–33'] *33a through 33j–34a through 34j* are determined by endless-chain systems 129 carried over sprockets 127–195 on the shafts 116–115. Of these, shaft 115 is driven and shaft 116 is held fixed against rotation. A heavy phantom alignment at 196 schematically indicates guide-rail support for the upper horizontal courses of the chain systems 129 between sprockets 195–127, and a similar phantom line 197 suggests guide-rail means for the lower and downwardly offset span of the chain systems 129. At positions corresponding to the clusters to be engaged, each chain system 129 includes a special link 198 with an integral downward offset 199, whereby bar positioning mechanism may be pivotally supported at an offset pin 200 (see FIG. 16). Pins 200 connect such offsets 199 to flat plates or levers 201, and the spacer bars 33′ are pivotally connected to the plates 201.

In the form shown, *with reference to FIG. 14*, the nature of the latter pivotal connection is by way of a stud 202 secured by means 203 to the plate 201; stud 202 is received in an end bore or bearing, at the end of bar [ 33′ ] *34a, for example*, or carried by the rigid arm 36, provided in duplicate at the respective ends of bar [ 33′ ] *34a*. The location of stud 202 establishes a pivot axis 204 which is offset from the axis of pivot pins 200, so that any rocking displacement imparted to the plates 201 will change the direction of offset of the spacer-bar axis 204, with respect to the point of connection (200) to the chain system 129. Each of the plates 201 is shown to be elongated and to include a tail carrying cam-follower means, such as an outwardly offset roll 205. Similarly, the connecting arms 36 between the loop-forming bar and the spacer bar [33′] *34a* are further elongated to establish a tail carrying cam-follower means such as a pin or roll 206, projecting outwardly in the case of one bar 36, and projecting axially inwardly for the case of follower 207 on the other arm 36 of a given connection of bars [33–33′] *33a–34a, for example*. The structure comprising bars [ 33–33′ ] *33a–34a*, and the arms 36 will be understood (a) to be rigid and to pivot as a unit about the two end stud supports 202 and (b) to be carried by plates 201 which can articulate about the pivot axis of pins 200. To complete the description of parts, further cam-following means is shown on the arm 36 having the follower 207; of these, one cam-follower (308) is offset in the trailing direction, and the other cam-follower (209) is off-set in the forward direction. Finally, a follower pin 227 projects outwardly of the other bar 36, on the axis of the loop-feeding bar [ 33 ] *33a*.

The coaction of the various cam followers and tracking elements identified for each of the assemblies of FIG. 16 will be described in connection with FIGS. 14 and 15. Basically, the cam-follower roll 205 tracks a continuous groove or slot between two guide plates 210–211 carried by the frame end following a course indicated by a continuous endless phantom line 212. This course in general maintains a given substantially constant radially offset relation with the course of the chain systems 129, except that in the region of approach to the paidout sheet material the course of the alignment 212 approaches the chain system 129 at the region 213, and this region is immediately followed by a region (214) of maximum outward deviation from the course of the chain system 129. The purpose of the indicated deviation 213–214 is to steepen the orientation of bars 36 to aid the quick entry of the bars [ 33–33′ ] *33a–34a* into the space Δ between clusters, followed by rapid forward acceleration beneath the containers. This steepening results from the simultaneous action of the deviations 213–214 and of follower-tracked fixed-cam surface 215–216, formed on plates rigidly related to the side frames of the machine. The offset follower arm 208 tracks the outer one of these surfaces, namely cam 216, and the follower pin or roller 207 tracks the contour of the inner cam 215. The plate 217 on which the contour 215 is formed is carried by the fixed shaft 116 at a boss 218 and is secured thereto by set-screw means 219.

At the other end of the course of chain systems 129, the off-set arms 209 engage and track a cam surface 220 on a fixed plate 221 (see FIG. 14). And on the upper return course, a fixed overhead plate 222 (see FIG. 15) having a specially contoured lower edge 223 intercepts and guides the remaining follower element 206. This contour includes a deep groove or notch 224 intermediate the ends of the upper span of the chain systems 129; the function of groove 224 is to allow followers 206 successively to rise into the groove 224, causing arms 36 to reverse their orientation as they progress from right to left along the upper span of chain systems 129. In the course of this reversal, pivoting takes place about the axis 204 as it moves along the upper span, and the phantom outline 36′ (and associated arrow) connotes the forward swinging action of arms 36, during the course of reversal. It will be noted that the mass and offset of the loop-forming bars [ 33 ] *33a through 36j* with respect to the pivot axes 204 is such as to assure gravity-suspension of bars [ 33 ] *33a through 33j* at all times, subject of course to positioning control as dictated by one or more of the various cam-tracking engagements. This pendulous action is all that is needed to urge follower means 206 into correct tracking relation with the cam 223 to effect reversal of the arms 36, and the slope of a terminal ramp 225 on the cam 223 is such as to correctly poise the arm 36 for smooth entering engagement of the tracking arm 208 with the cam 216 (see FIG. 14, for the suspension of bar 33j).

The operation of the overhead-bar systems [ 33–33′ ] will be more clear from the description of a full cycle, beginning for the case of loop-forming bar 33a in FIG. 14 (see also FIG. 6). At the instant depicted for bar 33a, the arm 36 is oriented to place the loop-forming bar 33a rearward of the corresponding spacer bar [33′] *34a*, and positive control of this orientation is achieved by cam-and-follower engagements 208–216 and 207–125, respectively. Up to this point, the offset of cam 212 from the course of chain systems 129 has been substantially constant, but the undulations 213–214 are about to occur (being tracked by follower roll 205). These undulations occur as elements 207–208 continue to be guided by the cams 215–216, with a resultant left-to-right whip action, after both the bars [33–33′] *33a–34a* have entered the space Δ between container clusters, and loop formation is substantially in progress; the net result of the various contributing cam actions is to assure clean, non-fouling passage of bars [33–33′] *33a–34a* in the space Δ, with bar [33] *33a* accelerated forward under containers, in the manner already described, all without interference with the normal, constant-speed passage of container clusters along the conveyor system. For convenience in interpreting FIG. 14, the alignment 226 connotes the elevation at which the bars [ 33–33′ ] *33a through 33j–34a through 34j* begin to enter the space Δ between clusters. Thus, the bar 33a is poised for such entry and the bar 33b has already traversed the space Δ, and is in the course of its accelerated forward movement beneath a container cluster; this specific relation is shown for arm 33b in FIG. 6.

Once the loop-forming bar 33 has traversed the space Δ and has cleared the bottom plane of conveyed clusters, the following roll or pin 227 (FIG. 16) engages a fixed positioning rail or guide 228 (see FIG. 15). Rail 228 assures that bars [33] *33a through 33j* will be given positive support along the lower course of chain systems 129, so that all clusters may rely upon bar

[33] *33a through 33j* for vertical positioning support, as in the case of clusters Y, X, W, V in FIGS. 6 and 7.

The rail 228 provides the indicated supporting function throughout the entire course of lower horizontal movement, i.e., until these bars are retracted via the space Δ. Retraction commences as follower 227 rides down the terminal ramp 229 of the rail 228 and as the course of chain systems 129 rises, thereby causing the arms 36 to steepen their orientation (in the clockwise sense, as viewed in FIGS. 14 and 15). In the course of this retraction, the follower 209 picks up the fixed cam 220 to assure non-fouling positioning of the loop-forming bars [33] *33a through 33j* with respect to the space between clusters. In FIG. 15, the bar 33f is shown to be thus positioned, near the point of departure from the space Δ, between clusters V–U. Having left the space Δ, arms 36 continue to be controlled by the remainder of cam 220 until follower pins 206 come under the quidance of the upper cam profile 223, for reversal and recycling.

Figures 6A, 8, 9:
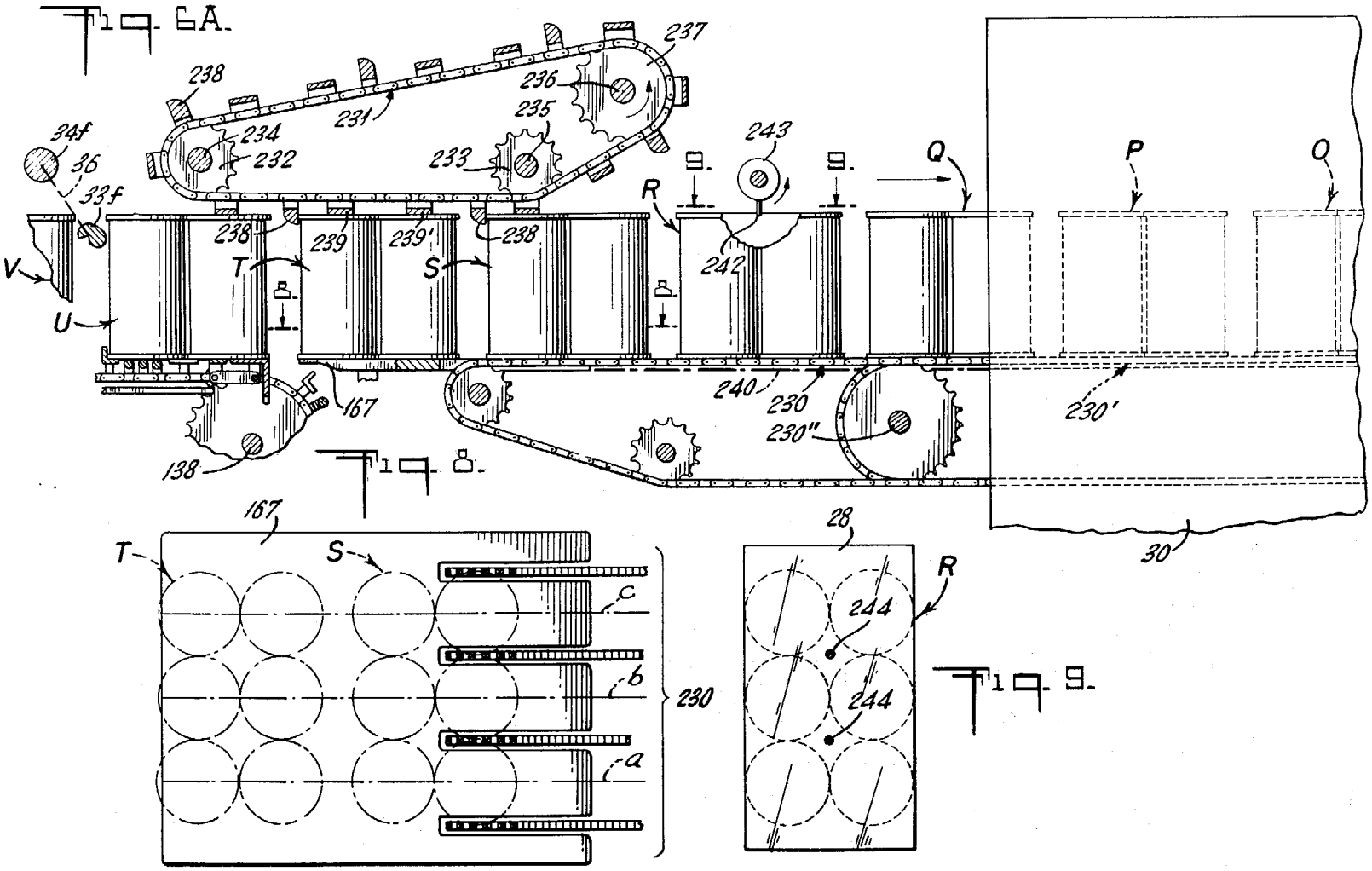
FIG. 8 is a plan view of cluster-supporting and advancing mechanism, as seen from the aspect 8–8 of FIG. 6A.
FIG. 9 is a plan view of a wrapped cluster, as seen from the aspect 9—9 of FIG. 6A, to illustrate a puncturing operation.

Having accomplished wrapping, the clusters are delivered in succession to the oven 30 for brief exposure to accomplish shrinking, and bonding of the overlapped-flap regions. It has been indicated that passage through the oven may be at a faster rate than other conveyor-line movements of the clusters, but FIG. 6A illustrates a system in which the same rate of container-cluster advance is maintained. Transfer of control, from the conveyor elements of the packaging phase, to the conveyor system 230 of the shrink-and-delivery phase, is accomplished by an overhead system of bars carried by endless chains 231. In FIG. 6A, the delivery end of the packaging phase will be recognized at shaft 138 which is about to be traversed by the advancing cluster U. For purposes of simplicity in the showing of FIG. 6A, the wrappings have been omitted on the clusters but cluster U, for example, will be understood to have been fully enveloped as described for cluster U in FIG. 7.

The chain systems 231 provide a horizontal span between sprockets 232–233 on shafts 234–235, and synchronized drive to the system is imparted at an offset shaft 236 carrying the drive sprocket 237. Transversely extending bars between corresponding links of the chain systems 231 include outwardly projecting bars or lugs 238 which enter the space Δ between container clusters and which engage trailing edges of containers in each cluster, for assuring correctly phased, positive, feeding advance during transition from the packaging conveyor to the exiting-conveyor system 230. Between the advancing bars 238, stabilizing bars 239–239′ engage the top surface of the transversely aligned containers in each cluster, and the course of such feeding includes passage along the table or shoe plate 167.

Plate 167 appears in greater detail in the plan view of FIG. 8, where the clusters T and S are seen in phantom outline. In FIG. 6A, clusters T and S are being fed by bars 238 along the plate 167 and into the region of overlap with the chain systems 230. The chain systems 230 alone may be relied upon for support of the clusters in the region of passage through the oven 30. However, I prefer to transfer container support from the four parallel systems 230 (which are shown in FIG. 8 on longitudinal alignments to support laterally outer edges of each transverse row of containers) to a similar set of three parallel systems 230′ (aligned with the centers of passing containers). The systems 230′ are symmetrically interlaced between systems 230 and may be driven by sprockets on the drive shaft 230″, common to both of systems 230 and 230′. Thus, for clusters Q–P–O which have traversed shaft 230″, containers are supported on individually centered alignments which are laterally related to the alignments 230, in the manner suggested by alignments designated a–b–c in FIG. 8. It follows that in the region of oven 30, the three flights of chain systems 230′ provide distributed support of each wrapped cluster, with minimum obstruction of heat flow to the wrapping (sheet) material; in particular, the heat-flow access is most direct in the projecting end regions of the wrap and in that region of overlap 24–25 where container bottoms do not directly back the sheet material.

It will be understood that to maintain the correct plane of bottom support for the passing clusters throughout systems 230–230′ suitable guide-rail, systems may be positioned beneath each flight of chains, as suggested by heavy phantom outline 240 in FIG. 6A.

Depending upon the configuration of packaging detail, which may be a matter of ultimate customer preference, finger-access apertures may be automatically formed and correctly sized during the course of the shrinking phase. For example, the paperboard covers or top panels 42 may include punch-outs, as at 241 (FIG. 1), more than adequate to serve finger insertion into the spaces fully enclosed by nested cylindrical container bodies, and of course the upper and lower ends of these spaces will have been closed in the course of sheet-wrapping, in the packaging phase of passage through my mechanism. I have found that by merely pinpricking the plastic sheet material within the area of the punched openings 241, and by then subjecting the material to an oven environment, the pin-prick apertures enlarge sufficiently to make for exceedingly easy finger-access, as when the customer wishes to handle a container cluster. The pin-pricking operation is shown in FIG. 6A to be accomplished at a station operating on the cluster R, at which station two laterally spaced aligned pins 242 are carried by a transversely extending rotary assembly 243. The speed of rotation is matched to the rate of advance of the passing clusters, and the timing is such as to accomplish local piercing of the top panel 28 at the regions indicated by heavy dots 244 in FIG. 9. As indicated, the areas thus pierced enlarge to convenient finger-accessing openings as each wrapped cluster passes through the oven atmosphere. It will be understood that in the event that the clusters are wrapped without inserted paperboards 42, the same pin-pricking operation at 242 will accomplish a similar result, making for more ready manipulation of an all-plastic wrapped cluster.

It will be appreciated that the described positioning, feeding, and control elements of my invention provide great assurance against fouling and therefore assurance of continuous and smooth flow through all operations. In certain cases, as for example when using heavier-gage wrapping materials, and even for materials for the indicated gages, it is possible to dispense with some of the control elements and still achieve good commercially usable results. For example, the dragging devices 187–188–190 are not needed if adequate control is maintained so as to direction and volume and flow at the air-blast device 39. Also, a simplification may be realized by eliminating the articulated flap-retaining plates 40 and their actuating mechanisms and by relying primarily upon flat bars, such as the bars 155, thus also eliminating the chain systems 140 with their various support elements 170–173–174–175–176. Such a simplified system is shown in FIG. 17 wherein the general format of FIG. 7 is followed and wherein many of the same parts will be recognized. In FIG. 17 and in related FIGS. 18 and 19, many of these same reference numerals are carried forward, and in some instances primed notation has been applied to parts which correspond to those previously identified by the same numerals.

Briefly, the modification of FIGS. 17 to 19 utilizes the same overhead system of loop pull-out bars *33a through 33j* [33] and spacer bars [33′] *34a through 34j* as already described, except that overall length has been shortened as appropriate to the accommodation of cluster-supporting and flap-manipulating structure beneath the successive clusters Z′–Y′–X′–W′ (as contrasted with the longer system required for clusters Z–Y–X–W–V–U, in FIG. 7). The elongated chain systems 131′ are correspondingly shortened, being carried over sprockets 132′–133′ to define the container-supporting shortened upper span 136′. The systems 131′ are driven at the speed of cluster movement and they provide only one elevated positioning bar 250 for each cluster, being shown transversely spanning the forward row of containers in each cluster; an offset or pedestal 251 rigidly connects each bar 250 to its special link in the chain systems 131′.

The second, and remaining chain systems 146 establish an upper span of support (via bars 178) in the initial region, between sprockets 147–148, and these systems 146 are run at greater speed than systems 131′, to permit each bar 178 to lead its adjacent loop pull-out bar, *for example bar 33b* [33], beneath the rear row of containers in each cluster. For example, in FIG. 17, the cluster Y″ is fully supported by bar *33b* [33], and bar 178 has released its contact with the cluster and is about to whip downward, behind the adjacent forward-support bar 250.

Cut-off is displayed in the context of cluster X′. This function is as previously described and therefore need not be repeated. The only difference is in the more elongate nature of the cross-section of bars *33a through 33j* [33], in the more forward positioning of groove 38 therein, and in the further-forward ultimate positioning of *bars 33a through 33j* [bar 33] (occasioned by longer connecting arms 36), whereby the cut-off flap end 186 may be as short as possible, beyond its pinched retention by bar [33] *33c, for example* against the container bottoms. Having accomplished cut-off, the system of FIGS. 17 to 19 is ready to complete the wrapping, in the course of discharge to the fixed plate or shoe 167′ which guides clusters to the exiting conveyor systems of FIG. 6A. The cluster W′ is being subjected to successive stages of this operation in the respective showings of FIGS. 17, 18 and 19.

The shuttle plate 31 is an important element in achieving completed wrapping and transfer to the exiting conveyor systems. Plate 31 will be understood to be supported by suitable guide means (not shown) positioning its upper surface in the plane of support of passing clusters and guiding the same for longitudinally reciprocated movement, between a full-forward position against shoe plate 167′ (FIGS. 17 and 18) and a full-retracted position (FIG. 19). The reciprocating cycle of shuttle plate 31 is interlaced with the adjacent passage of successive container-support bars 250; a appropriate synchronization is merely schematically suggested in FIG. 17, at rotary means 252 tracking the continuous movement of the conveyor chains system (131′) and driving means such as a crank or eccentric to convert the picked-off rotary movement into intermittent longitudinal reciprocating of plate 31, in the indicated phase-interlace with passage of bars 250.

In the instant depicted in FIG. 17, shuttle plate 31 is fully retracted to allow for the clear passage of the bar 250 as it whips downward, around sprocket 133′. The cluster W′ is supported by bar *33d* [33] and has just begun to realize forward-edge contributing support from shuttle plate 31, with the result that cluster (W′) movement to this point has caused the hanging flap 180 to begin to tuck under the forward part of the bottoms of the front container row.

By the time that cluster W′ reaches the position shown in FIG. 18, the leading edge of the cluster has begun to realize support from the fixed shoe 167′, and more of the flap material 180 has been applied to the cluster bottom, forming what ultimately will be the flap 24. The shuttle 31 is still forward (to the right), and a heavy arrow to the left suggests that its retraction is just beginning, having safely cleared the bar 250; at the same time, bar 250 has transient control of the unfolded remainder of the flap 24. It is at this instant that the air-blast device is operative to complete the lay-up of the rear flap 25 (full outline in FIG. 18) from its cut-off hanging position (phantom outline 186 in FIG. 18). The air-blast device may be separately mounted and as described for FIG. 7, but in the form of FIGS. 17–18 its function is performed by the special nature of the fixed shaft 138′, on which sprockets 133′ are journalled for rotation, reliance being placed on other sprocket means (not shown in FIG. 17) to drive the chain systems 131′.

Shaft 138′ is hollow and is apertured at plural locations 254 along the span beneath the sheet material of passing clusters; a suitable air supply (not shown) serves the interior of shaft 138′. The apertures 254 are shown at the "one o'clock" position with respect to the axis of shaft 138′, to provide upward as well as forward components to the delivered blast, as suggested by the dashed arrow 255 in FIG. 18; the air supply may be continuous, but I prefer to control or modulate the magnitude of the blast 255 by means (not shown) synchronized with each instant as depicted in FIG. 18, so that the primary air-jet delivery occurs essentially only when it is needed to layup the flap 25, i.e., when flap 186 crosses the blast vector 255. Since flap 186 is small and of negligible mass, and since bar 250 transiently clears the other flap 24 out of the way, the layup of flap 25 is virtually instantaneous and is complete by the time that shuttle 31 laps it with the forward flap 24. FIG. 19 shows completion of the lap, by shuttle action, and at the instant of commencing the return of shuttle 31 to its forward position. The ensuing continued forward movement of the cluster W′ does nothing to impair the completed wrap; on the other hand, the wrap is maintained for bonding and shrinking at oven 30.

During the reciprocation of shuttle plate 31 from its FIG. 18 position to its FIG. 19 position, and as a further consequence of the continuous conveyor movement of cluster W′, the shuttle plate 31 has been able to sustain the major supporting role for cluster W′. This will have occurred prior to the instant depicted in FIG. 19, and therefore the bar [33] *33d* is no longer needed for support. FIG. 19 shows bar [33] *33d* downwardly retracted, to safely clear the shuttle plate 31, without sacrifice of container support. Such retraction of bar [ 33 ] *33d* will be understood to be determined by a suitable down-ramp end formation on the cam 228, analogous to that described at 229 in connection with FIG. 15.

It will be seen that I have disclosed shrink-wrapping methods and apparatus achieving all the stated objects and providing highly efficient production-line wrapping. Wrapping is achieved without interruption or alteration of the continuous flow of articles. Wrapping utilizes but a single continuous sheet of wrapping material, which is applied in the direction of maximum shrink and also in the direction of conveyor movement. Cut-off does not take place until each article is substantially fully wrapped and this occurs at the bottom, so that the resulting wrapped product may have greatest aesthetic appeal and so that the greatest optional opportunity and flexibility are affored the user to display promotional material at the top (or overlapping the ends or sides) of the wrapped clusters. Most importantly, the method and the machine offer significant economies in the cost of wrapping, and the strength and durability of the wrapped product are, if anything, improved over existing processes.

While the invention has been described in detail for the preferred methods and structures are shown, it will be understood that modifications may be made without departing from the scope of the invention.

I claim:

1. Means for continuously packaging like generally rectangularly prismatically arrayed clusters of articles, comprising elonated conveyor means for supporting and transporting a continuous succession of clusters in equally spaced relation, an elongated supply of flexible envelope sheet material of width exceeding the cluster width transverse to the direction of conveyor transport, sheet-engaging means applying sheet material in vertical register with said clusters and in longitudinal conformance with the direction of cluster transport along said conveyor means, means holding a part of said sheet material engaged to a part of one cluster during cluster passage through a limited region along said conveyor means, movable loop-forming means including a bar spanning the width of said sheet material, bar-positioning means synchronized with conveyor transport of said clusters and determining a path of bar movement in which said bar intercepts said sheet material and then pulls a loop of sheet material over a vertical displacement between said one cluster and the next-succeeding cluster and to the extent of at least the vertical cluster dimension, said bar-positioning means being thereafter operative to horizontally displace said bar along a substantial fraction of the longitudinal extent of a vertical end of said one cluster, cut-off means synchronized with conveyor transport of said clusters and coacting with sheet material to transversely sever the same adjacent said bar when in said horizontally displaced relation to said one cluster, thereby defining from the severed halves of the loop a back panel in part enveloping said one cluster and a front panel in part enveloping the next-succeeding cluster.

2. Continuous-packaging means according to claim 1, in which said bar has a local groove in its outer surface, said groove facing said cut-off means and said bar holding sheet material across the groove at the synchronized instant of cut-off coaction.

3. The method of continuously automatically grouping into like clusters and along a production conveyor a supply of like upstanding individual containers having cylindrical body parts, said method comprising confining the lateral limits within which containers pass along the conveyor, said limits successively defining a converted zone contiguous to a diverging zone, said converged zone being of effective lateral extent that is greater than twice but less than three times the effective container body diameter, whereby at said converged zone groups of three laterally adjacent containers tend naturally to be confined by each other and by the limits of the converged zone into a pattern of a center container symmetrically contacting each of two outer containers in longitudinally offset relation to the outer containers, said groups being longitudinally nested into contact relation with each other, said diverging zone expanding in the direction of container movement to a lateral extent which is at least three times the effective container body diameter, accelerating the longitudinal feed of the center containers with respect to movement of the outer containers as said container progress through said expanding zone, thereby causing the outer containers to laterally displace as the center containers overtake and become transversely aligned with the outer containers, and thereafter feeding in unison successive groups of transversely, aligned containers, said last feeding step being at a rate faster than that of container movement at the achievement of transverse alignment, whereby each successively fed group of transversely aligned containers is caused to establish a longitudinally spaced relation to the next succeeding group, and packaging the longitudinally spaced groups of containers by introducing enveloping material into the longitudinal spacing between container groups.

4. The method of claim 3, in which the enveloping material is supplied as a sheet elongated in the direction of container movement, the material introduced into the longitudinal spacing being a double loop from said sheet and extent exceeding container height, and severing said material at the end of the loop, whereby for each doubled loop introduced into one of said spacings separate back and front panels will have been applied to the back of one aligned group and to the adjacent front of the next aligned group.

5. The method of claim 4, comprising the further step of interconnecting the cut-off front and back ends of the sheet material contiguous to the front and back panels of one aligned group.

6. Continuous-packaging means according to claim 2, in which said cut-off means comprises a cut-off element supported for rotation about a fixed transversely extending axis and so synchronized with said bar-positioning means as to intercept sheet material for cut-off in the region within angular limits of said groove.

7. The method of continuously automatically grouping into like clusters and along a production conveyor a supply of like upstanding individual containers having cylindrical body parts, said method comprising confining the lateral limits within which containers pass along the conveyor, said limits successively defining a converged zone contiguous to a diverging zone, said converged zone being of effective lateral extent that is greater than twice but less than three times the effective container body diameter, whereby at said converged zone groups of three laterally adjacent containers tend naturally to be confined by each other and by the limits of the converged zone into a pattern of a center container symmetrically contacting each of two outer containers in longitudinally offset relation to the outer containers, said groups being longitudinally nested into contact relation with each other, said diverging zone expanding in the direction of container movement to a lateral extent which is at least three times the effective container body diameter, accelerating the longitudinal feed of the center containers with respect to movement of the outer containers as said containers progress through said expanding zone, thereby causing the outer containers to laterally displace as the center containers overtake and become transversely aligned with the outer containers, and thereafter feeding in unison successive groups of transversely aligned containers, said last feeding step being operative on aligned groups at alternate alignments thereof and at a rate faster than that of container movement of the achievement of transverse alignment, whereby each successively fed group comprises a two-by-three cluster of six containers which is caused to establish a longitudinally spaced relation to the next succeeding cluster, and packaging said clusters of containers by introducing enveloping material into the longitudinal spacing between clusters.

8. Continuous-packaging means according to claim 1, in which said sheet material is a heat-sensitive plastic and in which cut-off means includes heated means having transient local engagement with said sheet material.

9. Continuous-packaging means according to claim 6, in which said cut-off means further includes a transversely extending tensioning bar in such phase-offset relation to said cut-off element as to have engaged and locally elevated the tension of sheet material across said groove at the time of cut-off.

10. Continuous-packaging means according to claim 1, in which said substantial fraction is at least substantially one-half said longitudinal extent, whereby severance by said cut-off means is operative to define end flaps of length adequate to overlap said vertical end of each successive cluster, and flap-folding means synchronized with cluster transport and operative after cut-off to apply the front and rear flaps of each cluster into overlapping relation along the said vertical end thereof.

11. Continuous-packaging means according to claim 10, and including means synchronized with cluster transport and securing said overlapped flaps to each other.

12. Continuous-packaging means according to claim 11, in which said sheet material includes a surface with thermally sensitive adherent properties, and in which said securing means includes means transiently supplying heat to at least a part of the overlapped flaps.

13. Continuous-packaging means according to claim 12, in which said sheet material is heat-shrinkable and in which said securing means comprises an oven served by said conveyor.

14. Continuous-packaging means according to claim 1, in which said sheet material supply comprises a reel supported for rotation about an axis transverse to and vertically offset from the path of cluster transport along said conveyor means.

15. Continuous-packaging means according to claim 10, in which said flap-folding means includes compressed-air jet means positioned to lay the back flap along the said vertical end of each successively passing cluster.

16. Continuous-packaging means according to claim 10, in which shoe means carried by said machine at a location forward of operation of said air-jet means is poised to intercept and fold the front flap along said vertical end of each successively passing cluster, in reaction to transported movement of each cluster past said shoe means.

17. Continuous-packaging means according to claim 1, in which said sheet material supply is above the path of cluster movement along said conveyor means, and in which said bar engages said sheet material from above to thereby pull the loop downwardly between clusters and in forwardly overtaking relation along the bottom of said one cluster.

18. Continuous-packaging means according to claim 17, in which said conveyor includes a continuously driven endless loop synchronized with cluster transport and having a span beneath the path of cluster movement and forward of the cutoff location, said endless loop including cluster-supporting elements positioned to engage and contribute to the support of clusters entering and passing said span, said elements including means positioned to hold the cut-off end of the back panel against the bottom of each cluster.

19. Continuous-packaging means according to claim 17, in which said conveyor includes a continuously driven endless loop synchronized with cluster transport and having a span beneath the path of cluster movement and embracing at least substantially (a) the location of bar displacement below the bottom plane of cluster support and (b) the location of cut-off, said endless loop including cluster-supporting elements positioned to engage and contribute to the support of clusters entering and passing said span, said cluster-supporting elements being spaced and positioned along said endless looop to avoid interference with said bar.

20. Continuous-packaging means according to claim 19, in which said bar-positioning means is further operative after cut-off to retard its forward movement with respect to said one cluster until in vertical register with the space between said one cluster and the next succeeding cluster, and to thereafter retract vertically upwardly in said space and into clearance relation with the path of cluster movement.

21. Continuous-packaging means according to claim 1, in which said bar-positioning means includes an endless loop of linked bar-supporting elements, and in which said bar is one of a plurality, spaced along said endless loop in accordance with bar-coaction requirements at successive spaces between successive clusters.

22. Continuous-packaging means according to claim 21, in which said bar-positioning means includes for each bar a bar-offsetting arm pivotally connected to a part of said loop, the pivot axes being transverse to the conveyor transport direction, and cam-and-follower elements reacting between said arms and fixed references to said machine in the course of endless-loop movement, whereby said bars are positioned in variably offset relation to the path of endless-loop movement.

23. Continuous-packaging means according to claim 22, in which a cluster-spacing bar is carried on each pivot axis in parallel offset relation to said loop-forming bars.

24. Continuous-packaging means according to claim 23, in which said bar-positioning means includes for each bar-offsetting arm an auxiliary arm which is the means of pivotally connecting said offsetting arm to a part of said loop, said offsetting arm being pivotally connected to said auxiliary arm and said auxiliary arm being pivotally connected to a part of said loop, and cam-and-follower elements reacting between said auxiliary arms and fixed references to said machine in the course of endless-loop movement.

25. Continuous-packaging means according to claim 21, in which said conveyor means includes an upper endless loop driven in synchronized relation with cluster transport and including a span above and overlapping the cluster-wrapping region, said upper endless loop including container-stabilizing elements spaced in accordance with the spacing of corresponding parts of passing clusters.

26. Continuous-packaging means according to claim 25, in which said container-stabilizing elements include cluster-spacing bars in longitudinally spaced interlaced relation with container hold-down elements.

27. The method of packaging successive like clusters of articles in the course of transport in longitudinally spaced relation along a continuously moving path of cluster transport, which comprises supporting an elongated stretch of flexible envelope sheet material over a plurality of adjacent clusters, *pulling a first loop of the sheet material down into through and beyond a first space between a first cluster and a next succeeding second cluster*, holding part of the [lead end] *first loop* of said material fast *relative* to [a] *the* first cluster, pulling a [first] *second* loop of sheet material down into through and beyond [the] *a second* space between said [first] *second* cluster and the next-succeeding [second] *third* cluster, the extent of *the first* loop pull-through past said *first* space being at least one half the longitudinal extent of a cluster, severing the *first* loop to define similar but separate cluster-side panels respectively adjacent the rear vertical side of said first cluster and the front vertical side of said second cluster, whereby said front vertical side panel becomes part of [the] *a* newly formed lead end of said material, holding part of said newly formed lead end of said material fast to said second cluster, pulling a [second] *third* loop of sheet material down into through and beyond [the] *a third* space between said [second] *third* cluster and [the] *a* next-succeeding [third] *fourth* cluster, to the extent of pull-through of said *first* loop, severing said second loop in the manner of severing said first loop and securing to each other the severed ends *of said first and second loops* at the front and back of said second cluster.

28. The method of claim 27, in which said secured ends are secured after first overlapping the same at the bottom of said second cluster.

29. The method of claim 28, in which said overlapped ends are arranged with the end of the front panel outside of and overlapping the end of the rear panel of said second cluster.

30. The method of claim 28, in which said sheet material is of heat-shrinkable plastic, and in which the wrapped cluster is transiently exposed to a heated environment after overlapping said ends.

31. The method of claim 30, in which the width of said plastic sheet exceeds the overall cluster width and is positioned over the path of cluster movement so as to project excess sheet material substantially symmetrically beyond both lateral limits of said clusters, whereby upon shrinking said projecting ends reduce to inwardly retain the cluster contents.

32. The method of claim 30, in which spaced localized punctures are applied to the sheet material at the top end of said cluster after end-overlap and prior to heated-environment exposure.

33. The method of claim 32, in which said clusters are two-by-three groupings of like cylindrical containers, thereby defining a first totally enclosed space column between a first outer two containers and the central two containers, and also defining a second similar space column between the other outer two containers and the central two containers, said punctures being respectively located within the intercepts of said space columns with the enveloping sheet material.

34. The method of packaging successive clusters of articles in the course of transport in longitudinally spaced relation along a continuously moving path of cluster transport, said clusters being of like extent in the longitudinal direction of cluster transport, which comprises supporting a stretch of flexible envelope sheet material above the path of cluster movement, pulling a first loop of sheet material down into through and beyond the space between a first cluster and the next-succeeding *second* cluster, the extent of loop pull-through past said space being at least one-half the longitudinal extent of a cluster and in the direction of cluster transport and immediately adjacent the bottom of said first cluster [,] whereby sheet material is applied first to the bottom of the trailing half of said *first* cluster, [severing the loop to define similar but separate cluster-side panels respectively adjacent the rear vertical side of said first cluster and the front vertical side of said second cluster, whereby said front vertical side panel becomes part of a newly formed lead end of said material,] holding part of said [newly formed lead end] *sheet material* fast *relative* to said second cluster, pulling a second loop of sheet material down into through and beyond the space between said second cluster and [the] *a* next-succeeding third cluster [,] to the previously stated extent of *said first* loop pull-through *to apply sheet material to the bottom of the trailing half of said second cluster, severing the first loop to define similar but separate cluster side panels respectively adjacent the rear vertical side of said first cluster and the front vertical side of said second cluster whereby said front vertical side panel becomes part of a newly formed lead end of said material*, severing said second loop in the manner of severing said first loop *to form a further lead end*, and lapping said first-mentioned lead end over the forward half of the bottom of said second cluster and in overlapped relation with the *material applied to the bottom of the second cluster* trailing half [lapped] by *said second* loop pull-through.

35. The method of claim 34, in which a flow of pressurized air is directed on the severed end of material pulled through and immediately adjacent the cluster bottoms at least at the instant prior to said step of lapping said first-mentioned lead end.

36. Continuous-packaging means according to claim 1, in which the path of conveyor transport is generally horizontal and said sheet material supply is above the path of cluster transport, said bar being downwardly displaced and forwardly displaced along and in local bottom-supporting relation with clustered containers in the course of loop pull-out, said conveyor means including a second bar extending transverse to the conveyor transport direction and positioned in local supporting relation with clustered containers, and drive means determining a path of forward movement of said second bar at a rate faster than the speed of cluster transport and phased ahead of and adjacent the forward-advancing movement of said loop pull-out bar, whereby said bars share in the transient support of container clusters.

37. Continuous-packaging means according to claim 36, in which said second bar is positioned to engage and locally support clustered containers prior to completion of passage of said loop pull-out bar through the space between clusters.

38. Continuous-packaging means according to claim 37, in which said second bar is one of a plurality of similar spaced bars carried by an endless conveyor system synchronized with drive of said bar-positioning means.

39. The method of claim 27, in which said clusters are longitudinally spaced two-by-three groupings of like cylindrical containers, aligned as two adjacent rows of three, and extending transverse to the path of cluster transport; said clusters being formed from a continuous supply of the containers by passing the containers through a confining converged zone contiguous to a diverging zone, said converged zone being of effective lateral extent that is greater than twice but less than three times the effective container body diameter, whereby at said converged zone groups of three laterally adjacent containers tend naturally to be confined to each other and by the limits of the converged zone into a pattern of a center container symmetrically contacting each of two outer containers in longitudinally offset relation to the outer containers, said groups being longitudinally nested into contact relation with each other, said diverging zone expanding in the direction of container movement to a lateral extent which is at least three times the effective container body diameter, and transiently accelerating the longitudinal feed of every other center container with respect to movement of the outer containers as said containers progress through said expanding zone, thereby causing the outer containers to laterally displace as the center containers overtake and become transversely aligned with the outer containers, and thereby also causing each cluster of six containers to longitudinally separate from the next-adjacent such cluster, the first and second loops of flexible sheet material being respectively pulled through the longitudinal separations between first and second adjacent clusters and between second and third adjacent clusters.

40. Continuous-packaging means according to claim 1, in which said articles are like upstanding cylindrical containers and in which said conveyor means include side-rail means defining spaced lateral limits of said conveyor means along a portion of the length thereof in advance of the region of said loop-pulling vertical displacement of said bar, said rail means being laterally spaced in a converged region of effective width between two and three times the effective container-body diameter, said rail means including a diverging region issuing from said converged region and expanding in the direction of container movement to a lateral extent which is at least three times the effective container body diameter, first feed means operative to feed containers through said converged region in a continuous regular pattern in which centrally aligned containers are longitudinally offset from and symmetrically contact adjacent outer containers in spaced longitudinal alignments of outer containers, second feed means operative throughout said diverging region to feed center containers at a rate so differing from the rate of feed of corresponding adjacent outer containers that, at that point in the diverging region where the lateral extent becomes substantially three times the effective container diameter, the center containers become substantially transversely aligned in a cluster with corresponding adjacent outer containers, and third feed means operative to feed successive clusters in unison and in longitudinally spaced relation to and through the region in which said bar is vertically entered in the space between clusters.

* * * * *